US012740616B2

(12) United States Patent
Hettinga et al.

(10) Patent No.: US 12,740,616 B2
(45) Date of Patent: Sep. 22, 2026

(54) FOOTWEAR MIDSOLE WITH ANISOTROPIC MESH AND METHODS OF MAKING THE SAME

(71) Applicant: adidas AG, Herzogenaurach (DE)

(72) Inventors: Blayne Hettinga, Portland, OR (US); Shannon Pomeroy, Portland, OR (US); Iain Martin Hannah, Nuremberg (DE); Ladan Salari-Sharif, Portland, OR (US); Dustin Kendrick, San Francisco, CA (US); Jacques M. Perrault, Portland, OR (US); Andrew Schneider, Portland, OR (US)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 18/971,282

(22) Filed: Dec. 6, 2024

(65) Prior Publication Data

US 2025/0089844 A1 Mar. 20, 2025

Related U.S. Application Data

(63) Continuation of application No. 18/167,479, filed on Feb. 10, 2023, now Pat. No. 12,161,185, which is a (Continued)

(51) Int. Cl.
*A43B 13/18* (2006.01)
*A43B 3/00* (2022.01)
(Continued)

(52) U.S. Cl.
CPC .......... *A43B 13/186* (2013.01); *A43B 3/0036* (2013.01); *B33Y 10/00* (2014.12); *B33Y 80/00* (2014.12)

(58) Field of Classification Search
CPC ..... A43B 13/12; A43B 13/143; A43B 13/146; A43B 13/145
(Continued)

(56) References Cited

U.S. PATENT DOCUMENTS 354,693 A 12/1886 Dick
D29,749 S 11/1898 Bunker
(Continued)

FOREIGN PATENT DOCUMENTS

CN 101611953 A 12/2009
CN 102578760 A 7/2012
(Continued)

OTHER PUBLICATIONS

"Adidas Breaks the Mould With 3D-Printed Performance Footwear," Adidas Group, [Retrieved on Oct. 7, 2015], Retrieved from the Internet: ( http://www.adidas-group.com/en/media/news-archive/press-releases/2015/adi-das-breaks-mould-3d-printed-performance-footwear/ ).

(Continued)

*Primary Examiner* — Timothy K Trieu
(74) *Attorney, Agent, or Firm* — Sterne, Kessler, Goldstein & Fox P.L.L.C.

(57) ABSTRACT

Soles for articles of footwear including a mechanically anisotropic three-dimensional mesh. The mechanically anisotropic three-dimensional mesh can include one or more mechanically anisotropic regions with a first lattice shear modulus measured in a first direction and a second lattice shear modulus measured in a second direction opposite to or orthogonal to the first direction. The first and second lattice shear moduli are different to provide the three-dimensional mesh with mechanically anisotropic properties. The mechanically anisotropic three-dimensional mesh can be three-dimensionally printed.

20 Claims, 18 Drawing Sheets

Related U.S. Application Data continuation of application No. 17/069,728, filed on Oct. 13, 2020, now Pat. No. 11,589,647.

(51) Int. Cl.
*B33Y 10/00* (2015.01)
*B33Y 80/00* (2015.01)

(58) Field of Classification Search
USPC .................................................... 36/35 R, 28
See application file for complete search history.

(56) References Cited

U.S. PATENT DOCUMENTS 1,111,437 A 9/1914 Butterfield
D90,057 S 5/1933 Cleef
D107,977 S 1/1938 Tousley
D113,620 S 3/1939 Cairns
D115,636 S 7/1939 Sperry
2,205,356 A 6/1940 Rose et al.
D123,898 S 12/1940 Tousley
D138,517 S 8/1944 Meltzer
2,853,809 A 9/1958 Carlo
D196,491 S 10/1963 Papoutsy
3,253,601 A 5/1966 Scholl
3,416,174 A 12/1968 Novitske
3,793,750 A 2/1974 Bowerman
D241,484 S 9/1976 Castano
D241,688 S 10/1976 Johnson
4,012,855 A 3/1977 Gardner
D254,818 S 4/1980 Jones
D255,175 S 6/1980 Iwakata
D255,177 S 6/1980 Fuzita
D255,178 S 6/1980 Fuzita
D257,075 S 9/1980 Amicone et al.
4,271,606 A 6/1981 Rudy
4,297,796 A 11/1981 Stirtz et al.
4,309,831 A 1/1982 Pritt
D265,605 S 8/1982 Batra
4,378,643 A 4/1983 Johnson
D272,963 S 3/1984 Muller et al.
4,439,936 A 4/1984 Clarke et al.
D273,631 S 5/1984 Ueda
D278,851 S 5/1985 Austin
D279,620 S 7/1985 Ueda
D281,459 S 11/1985 Parker
4,607,440 A 8/1986 Roberts et al.
D288,621 S 3/1987 Surpuriya et al.
D297,383 S 8/1988 Mourad et al.
4,774,774 A 10/1988 Allen, Jr.
D299,681 S 2/1989 Miller et al.
D301,184 S 5/1989 Hase
D301,800 S 6/1989 Mitsui
D302,352 S 7/1989 Austin
D303,316 S 9/1989 Crowley
D307,817 S 5/1990 Schneider
D312,920 S 12/1990 Aveni
D316,324 S 4/1991 Rogers
D321,973 S 12/1991 Hatfield
D326,181 S 5/1992 Katz et al.
D333,555 S 3/1993 Hatfield et al.
D335,385 S 5/1993 Kawabata
D335,572 S 5/1993 Peterson
D336,775 S 6/1993 Smith
D337,428 S 7/1993 Allen, III et al.
5,236,637 A 8/1993 Hull
D339,464 S 9/1993 Teague
5,337,492 A 8/1994 Anderie et al.
5,367,791 A 11/1994 Gross et al.
D354,693 S 1/1995 Miller
5,391,072 A 2/1995 Lawton et al.
5,423,135 A 6/1995 Poole et al.
D370,993 S 6/1996 Mangee
5,529,473 A 6/1996 Lawton et al.
D384,795 S 10/1997 Hudson
D384,796 S 10/1997 Smith, III
D387,698 S 12/1997 Hatfield et al.
D389,993 S 2/1998 Ryan
D390,348 S 2/1998 Meyer et al.
D390,690 S 2/1998 Murai et al.
D391,747 S 3/1998 Avar
D393,341 S 4/1998 Marshall et al.
D394,342 S 5/1998 Schneider
D394,741 S 6/1998 Gaudio
D395,340 S 6/1998 Tresser
D395,343 S 6/1998 Lozano
D395,740 S 7/1998 Cass
D395,743 S 7/1998 Ryan
D397,546 S 9/1998 Merceron
5,799,417 A 9/1998 Burke et al.
D400,345 S 11/1998 Teaque
D401,745 S 12/1998 Greenberg
D401,747 S 12/1998 Cessor
D402,450 S 12/1998 Munns
5,862,614 A 1/1999 Koh
D404,897 S 2/1999 Marshall
D407,892 S 4/1999 Gaudio
D408,972 S 5/1999 Greenberg
D411,910 S 7/1999 Cessor
D412,050 S 7/1999 Chassaing
D412,239 S 7/1999 Sorofman
5,930,916 A 8/1999 Connor
5,983,529 A 11/1999 Serna
5,985,383 A 11/1999 Allen et al.
6,014,821 A 1/2000 Yaw
D420,208 S 2/2000 Birkenstock
6,021,588 A 2/2000 Alviso
6,076,283 A 6/2000 Boie
D432,762 S 10/2000 Weege
D432,763 S 10/2000 Smith, III
D433,215 S 11/2000 Smith, III
D442,768 S 5/2001 Matis
6,259,962 B1 7/2001 Gothait
6,367,172 B2 4/2002 Hernandez
D458,441 S 6/2002 Gillespie
D459,865 S 7/2002 Urie et al.
D461,040 S 8/2002 Urie et al.
D480,540 S 10/2003 Hoyt et al.
6,665,958 B2 12/2003 Goodwin
D485,662 S 1/2004 Magro
D488,916 S 4/2004 McClaskie
6,763,611 B1 7/2004 Fusco
D497,707 S 11/2004 Lee
D500,399 S 1/2005 Fuerst
D515,791 S 2/2006 McClaskie
D529,697 S 10/2006 Earle
D536,163 S 2/2007 McClaskie
D538,519 S 3/2007 McClaskie
D552,337 S 10/2007 Parekh et al.
D556,988 S 12/2007 Horne et al.
D561,438 S 2/2008 Belley
D561,439 S 2/2008 Schoenborn et al.
D561,443 S 2/2008 Robinson, Jr. et al.
7,383,647 B2 6/2008 Chan et al.
D572,462 S 7/2008 Hatfield et al.
D577,883 S 10/2008 Link
7,438,846 B2 10/2008 John
D586,994 S 2/2009 Chang
D593,741 S 6/2009 Vico et al.
D608,991 S 2/2010 Lamont
7,676,955 B2 3/2010 Dojan et al.
7,704,430 B2 4/2010 Johnson et al.
D616,640 S 6/2010 Werman
D621,143 S 8/2010 Lamont
7,892,474 B2 2/2011 Shkolnik et al.
D638,616 S 5/2011 Gibson
8,110,135 B2 2/2012 El-Siblani
D659,358 S 5/2012 Van Zyll De Jong et al.
8,191,284 B2 6/2012 Cho
D666,391 S 9/2012 Van Zyll De Jong et al.
D672,949 S 12/2012 Bramani et al.
D686,402 S 7/2013 Portzline
8,522,454 B2 9/2013 Schindler et al.
D691,359 S 10/2013 Della Valle et al.

(56) References Cited

U.S. PATENT DOCUMENTS

D695,502 S 12/2013 Miner
D696,004 S 12/2013 Della Valle et al.
D696,505 S 12/2013 Miner
D697,294 S 1/2014 Miner
D702,028 S 4/2014 Truelsen
D702,428 S 4/2014 Hlavacs
D703,425 S 4/2014 Lee
8,739,639 B2 6/2014 Owings et al.
D707,933 S 7/2014 McCourt
D709,274 S 7/2014 Roulo
8,776,396 B2 7/2014 Huynh
D711,637 S 8/2014 Miner
D713,628 S 9/2014 Greenspan
D741,586 S 10/2015 Truelsen
D743,154 S 11/2015 Nethongkome
D744,212 S 12/2015 Boudreau et al.
9,205,601 B2 12/2015 DeSimone et al.
9,211,678 B2 12/2015 DeSimone et al.
9,216,546 B2 12/2015 DeSimone et al.
D747,860 S 1/2016 De Costa Pereira Machado
D751,797 S 3/2016 Slimane
9,320,316 B2 4/2016 Guyan et al.
9,453,142 B2 9/2016 Rolland et al.
D769,593 S 10/2016 Chang
D773,162 S 12/2016 Lane, III et al.
D779,174 S 2/2017 De Montgolfier
D783,973 S 4/2017 Anceresi
D784,666 S 4/2017 Lok
D789,060 S 6/2017 Guyan et al.
D790,821 S 7/2017 Beers et al.
D792,689 S 7/2017 Mokos
D796,170 S 9/2017 Raysse
D796,806 S 9/2017 Durand
D798,561 S 10/2017 Ford
D799,184 S 10/2017 Chang
D800,432 S 10/2017 Klein
D802,896 S 11/2017 Rademacher et al.
D804,792 S 12/2017 De Montgolfier et al.
D809,752 S 2/2018 Campbell
D812,882 S 3/2018 Jenkins et al.
9,930,929 B2 4/2018 Cooper et al.
D816,961 S 5/2018 Bardea
D819,310 S 6/2018 Lashmore
D822,351 S 7/2018 DeAlmeida
10,010,133 B2 7/2018 Guyan
10,010,134 B2 7/2018 Guyan
10,016,013 B2 7/2018 Kormann et al.
10,034,516 B2 7/2018 Gheorghian et al.
D825,163 S 8/2018 Montross et al.
D825,165 S 8/2018 Gibson et al.
10,039,343 B2 8/2018 Guyan
D829,425 S 10/2018 Albrecht et al.
D831,315 S 10/2018 Mahoney
D831,317 S 10/2018 Jenkins et al.
10,104,934 B2 10/2018 Guyan
D836,892 S 1/2019 Jenkins et al.
D841,299 S 2/2019 Nikolic
D841,300 S 2/2019 Albrecht et al.
D841,301 S 2/2019 Albrecht et al.
D841,964 S 3/2019 Kaiserswerth
10,231,511 B2 3/2019 Guyan et al.
D844,953 S 4/2019 Chen et al.
D845,610 S 4/2019 Mayden et al.
10,259,171 B2 4/2019 Robeson et al.
D847,481 S 5/2019 Albrecht et al.
D848,716 S 5/2019 Shyllon
D849,382 S 5/2019 Jenkins et al.
10,279,581 B2 5/2019 Ashcroft et al.
D850,083 S 6/2019 Jenkins et al.
D851,873 S 6/2019 Maier
D854,300 S 7/2019 Evans
D855,957 S 8/2019 Evans
D857,350 S 8/2019 Hardy
D857,360 S 8/2019 Hardy
D857,362 S 8/2019 Thompson
D858,066 S 9/2019 Hatfield
D859,801 S 9/2019 Jenkins et al.
D860,614 S 9/2019 Bishoff
D862,051 S 10/2019 Goussev et al.
D862,866 S 10/2019 Albrecht et al.
10,426,226 B2 10/2019 Guyan et al.
10,434,706 B2 10/2019 Robeson et al.
D869,830 S 12/2019 Lucas et al.
D871,033 S 12/2019 Nikolic
D872,426 S 1/2020 Taylor
D873,546 S 1/2020 Henrichot
D876,056 S 2/2020 Henrichot
D878,016 S 3/2020 Henrichot
D879,428 S 3/2020 Braun et al.
D879,434 S 3/2020 Fick et al.
10,575,588 B2 3/2020 Perrault et al.
D880,120 S 4/2020 Fick et al.
D880,122 S 4/2020 Fick et al.
D880,131 S 4/2020 Fick et al.
D882,227 S 4/2020 Braun et al.
10,639,861 B2 5/2020 Minh et al.
D890,485 S 7/2020 Perrault et al.
11,589,647 B2 2/2023 Hettinga et al.
2002/0078598 A1 6/2002 Bell
2004/0087230 A1 5/2004 Wildeman
2006/0201028 A1 9/2006 Chan et al.
2007/0011914 A1 1/2007 Keen et al.
2007/0043582 A1 2/2007 Peveto et al.
2008/0289218 A1 11/2008 Nakano
2009/0126225 A1 5/2009 Jarvis
2009/0139112 A1 6/2009 Garneau
2009/0183392 A1 7/2009 Shane
2009/0293309 A1 12/2009 Keating et al.
2010/0122471 A1 5/2010 Edington et al.
2010/0170106 A1 7/2010 Brewer et al.
2010/0199520 A1 8/2010 Dua et al.
2010/0251565 A1 10/2010 Litchfield et al.
2010/0281714 A1 11/2010 Carboy et al.
2011/0099855 A1 5/2011 Cho
2012/0117825 A9 5/2012 Jarvis
2012/0178259 A1 7/2012 Miyazaki et al.
2012/0180335 A1 7/2012 Mahoney
2012/0186107 A1 7/2012 Crary et al.
2013/0118036 A1 5/2013 Gibson
2013/0145653 A1 6/2013 Bradford
2013/0171019 A1 7/2013 Gessler et al.
2013/0292862 A1 11/2013 Joyce
2013/0295212 A1 11/2013 Chen et al.
2014/0020191 A1 1/2014 Jones et al.
2014/0026773 A1 1/2014 Miller
2014/0029030 A1 1/2014 Miller
2014/0109441 A1 4/2014 McDowell et al.
2014/0150297 A1 6/2014 Holmes et al.
2014/0182170 A1 7/2014 Wawrousek et al.
2014/0223783 A1 8/2014 Wardlaw et al.
2014/0226773 A1 8/2014 Toth et al.
2014/0259779 A1 9/2014 Hashish et al.
2014/0259787 A1 9/2014 Guyan et al.
2014/0259788 A1 9/2014 Dojan et al.
2014/0259789 A1 9/2014 Dojan et al.
2014/0299009 A1 10/2014 Miller et al.
2014/0300675 A1 10/2014 Miller et al.
2014/0300676 A1 10/2014 Miller et al.
2014/0310991 A1 10/2014 Greene et al.
2015/0000161 A1 1/2015 Peyton et al.
2015/0033577 A1 2/2015 Dahl et al.
2015/0033579 A1 2/2015 Barnes et al.
2015/0033581 A1 2/2015 Barnes et al.
2015/0089841 A1 4/2015 Smaldone et al.
2015/0181976 A1 7/2015 Cooper et al.
2015/0223560 A1 8/2015 Wawrousek et al.
2015/0245686 A1 9/2015 Cross
2015/0331402 A1 11/2015 Lin et al.
2015/0351493 A1* 12/2015 Ashcroft ................ A43B 13/18
36/132
2015/0360419 A1 12/2015 Willis et al.
2016/0051009 A1 2/2016 Kormann et al.
2016/0122493 A1 5/2016 Farris et al.
2016/0137839 A1 5/2016 Rolland et al.

(56) References Cited

U.S. PATENT DOCUMENTS

2016/0160077 A1 6/2016 Rolland et al.
2016/0180440 A1 6/2016 Dibenedetto et al.
2016/0288376 A1 10/2016 Sun et al.
2016/0295971 A1 10/2016 Arnese et al.
2016/0324260 A1 11/2016 Guyan
2016/0324261 A1 11/2016 Guyan
2016/0360828 A1* 12/2016 Guyan ................ A43B 13/141
2016/0374428 A1* 12/2016 Kormann .............. A43B 7/141 36/28
2017/0129167 A1 5/2017 Castanon
2017/0129169 A1 5/2017 Batchelder et al.
2017/0150778 A1 6/2017 Youngs et al.
2018/0014606 A1 1/2018 Mokos
2018/0070736 A1 3/2018 Achten et al.
2018/0103719 A1 4/2018 Chen
2018/0126630 A1 5/2018 Panzer et al.
2018/0243976 A1 8/2018 Feller
2018/0271211 A1* 9/2018 Perrault ................ B33Y 50/00
2018/0271213 A1 9/2018 Perrault et al.
2018/0290374 A1 10/2018 Willis et al.
2018/0303199 A1 10/2018 Guyan
2018/0368518 A1 12/2018 Re et al.
2019/0069632 A1 3/2019 Meschter
2019/0098960 A1 4/2019 Weisskopf et al.
2019/0160733 A1 5/2019 Mirkin et al.
2019/0223543 A1 7/2019 Tamm et al.
2019/0223551 A1 7/2019 Hoffer et al.
2019/0269200 A1 9/2019 Tseng
2019/0289960 A1 9/2019 Loveder
2020/0093221 A1 3/2020 Caldwell et al.
2020/0156308 A1 5/2020 Ramos et al.
2020/0329815 A1 10/2020 Schmid
2021/0195989 A1 7/2021 Iwasa et al.
2021/0195995 A1 7/2021 Sakamoto et al.

FOREIGN PATENT DOCUMENTS

CN 203378623 U 1/2014
CN 209391169 U 9/2019
CN 209403686 U 9/2019
CN 110859355 A 3/2020
EP 0526892 A2 2/1993
EP 2564719 A1 3/2013
EP 2424398 B1 12/2015
EP 3013171 A1 5/2016
EP 3165109 A1 5/2017
ES 2442448 A1 2/2014
ES 2578730 A1 7/2016
JP 2002238609 A 8/2002
JP 2011251190 A 12/2011
JP 2014151201 A 8/2014
JP 3192899 U 9/2014
WO WO-2010126708 A2 11/2010
WO WO-2014008331 A2 1/2014
WO WO-2014009587 A1 1/2014
WO WO-2014015037 A2 1/2014
WO WO-2014100462 A1 6/2014
WO WO-2015164234 A1 10/2015
WO WO-2015169941 A1 11/2015
WO WO-2015169942 A1 11/2015
WO WO-2016066750 A1 5/2016
WO WO-2017210298 A1 12/2017
WO WO-2021169804 A1 9/2021

OTHER PUBLICATIONS

Green, D., Adidas is finally bringing 3D-printed shoes into the mainstream, Business Insider.com, Dennis Green, Retrieved from the Internet: (URL:https://www.businessinsider.com/adidas-releases-futurecraft-4d-shoe-2017-4/commerce-on-business-insider), (Year: 2017).

Janusziewicz, R., et al., "Layerless Fabrication With Continuous Liquid Interface Production," Proceedings of the National Academy of Sciences of the United States of America 113(42):11703-11708, National Academy of Sciences, United States (Oct. 2016).

Nikolic, I., Reebok Flexagon Training Shoes, Behance.net, Ilija Nikolic, Retrieved from the Internet (URL: https://www.behance.net/gallery/68953047/REEBOK-FLEXAGON-Training-Shoes?t- racking_source=curated_galleries_list) 2018, 10 pages.

Panetta., et al., "Elastic Textures for Additive Fabrication," ACM Transactions on Graphics 34(4), Article No. 135 (Aug. 2015).

Pearson, D., Adidas is giving Olympic athletes its first-ever 3D-printed shoes,Highsnobiety.com, Retrieved from the Internet: (URL:https://www.highsnobiety.com/2016/08/11/adidas-3d-printed-shoes-olympics/), (Year: 2016).

Reebok Flexagon, Retrieved from the Internet (URL: https://www.reebok.com/us/reebok-flexagon/CN2583.html), 2018.

Richard, B., Here's what 3D printed Future Craft adidas Yeezy boosts would look like Yeezys geared up for the future Retrieved from the Internet: (URL:https://solecollector.com/news/2015/11/adidas-yeezy-futurecraft-3d-print), (Year: 2015).

Tumbleston, J.R., et al., "Continuous Liquid Interface Production of 3d Objects," Science 347(6228):1349-1352, American Association for the Advancement of Science, United States (Mar. 2015).

Worman, C., Top Tennis Shoes Featuring a 6-Month Outsole Warranty, Retrieved from the Internet (URL: https://blogs.tennisexpress.com/blogs/top-tennis-shoes-featuring- - a-6-month-outsole-warranty/), (Year: 2018), 11 pages.

* cited by examiner

FOOTWEAR MIDSOLE WITH ANISOTROPIC MESH AND METHODS OF MAKING THE SAME

CROSS-REFERENCE TO RELATED APPLICATIONS

This application is a continuation of and claims priority to U.S. application Ser. No. 18/167,479, filed Feb. 10, 2023, which is a continuation of U.S. application Ser. No. 17/069,728, filed Oct. 13, 2020. Each of these applications is incorporated herein by reference in its entirety.

FIELD

The described embodiments generally relate to soles for articles of footwear. More particularly, described embodiments relate to soles for article of footwear including a three-dimensional mesh with one or more anisotropic properties.

BACKGROUND

The human foot is a complex and remarkable piece of machinery, capable of withstanding and dissipating many impact forces. The natural padding of fat at the heel and forefoot, as well as the flexibility of the arch, help to cushion the foot. Although the human foot possesses natural cushioning and rebounding characteristics, the foot alone is incapable of effectively overcoming many of the forces encountered during every day activity. Unless an individual is wearing shoes that provide proper cushioning and support, the soreness and fatigue associated with every day activity is more acute, and its onset may be accelerated. This discomfort for the wearer may diminish the incentive for further activity. Equally important, inadequately cushioned footwear can lead to injuries such as blisters; muscle, tendon, and ligament damage; and bone stress fractures. Improper footwear can also lead to other ailments, including back pain.

Individuals are often concerned with the amount of cushioning an article of footwear provides. This is true for articles of footwear worn for non-performance activities, such as a leisurely stroll, and for performance activities, such as running, because throughout the course of an average day, the feet and legs of an individual are subjected to substantial impact forces. When an article of footwear contacts a surface, considerable forces may act on the article of footwear and, correspondingly, the wearer's foot. The sole of an article of footwear functions, in part, to provide cushioning to the wearer's foot and to protect it from these forces.

Proper footwear should be durable, comfortable, and provide other beneficial characteristics for an individual. Therefore, a continuing need exists for innovations in footwear.

BRIEF SUMMARY

A first aspect (1) of the present application is directed to a sole for an article of footwear, the sole including: a three-dimensional mesh including: a plurality of interconnected unit cells, each interconnected unit cell having a plurality of struts defining a three-dimensional shape and a plurality of nodes at which one or more struts are connected; and a mechanically anisotropic region including: a first lattice shear modulus measured in a first direction, and a second lattice shear modulus different from the first lattice shear modulus and measured in a second direction opposite to or orthogonal to the first direction.

In a second aspect (2), the second lattice shear modulus according to the first aspect (1) is greater than the first lattice shear modulus.

In a third aspect (3), the second lattice shear modulus according to the first aspect (1) is 10% or more greater than the first lattice shear modulus.

In a fourth aspect (4), the first direction according to any one of aspects (1)-(3) is a forward direction pointing away from a heel end of the sole, and the second direction according to any one of aspects (1)-(3) is a rearward direction pointing toward the heel end of the sole.

In a fifth aspect (5), the first direction according to any one of aspects (1)-(3) is a medial direction pointing away from a lateral side of the sole, and the second direction according to any one of aspects (1)-(3) is a lateral direction pointing toward the lateral side of the sole.

In a sixth aspect (6), the first direction according to any one of aspects (1)-(3) is a longitudinal direction extending between a heel end and a forefoot end of the sole, and the second direction according to any one of aspects (1)-(3) is a transverse direction extending between a medial side and a lateral side of the sole.

In a seventh aspect (7), the plurality of struts of each unit cell according to any one of aspects (1)-(6) include: a strut having a first effective diameter, and a strut having a second effective diameter different from the first effective diameter.

In an eighth aspect (8), the strut having the first effective diameter according to the seventh aspect (7) is forwardly-oriented and the strut having the second effective diameter according to the seventh aspect (7) is rearwardly-oriented.

In a ninth aspect (9), the strut having the first effective diameter according to the seventh aspect (7) is medially-oriented and the strut having the second effective diameter according to the seventh aspect (7) is laterally-oriented.

In a tenth aspect (10), the plurality of interconnected unit cells according to any one of aspects (1)-(9) include individual unit cells each occupying a rectangular-cuboid volume.

In an eleventh aspect (11), the rectangular-cuboid volume according to the tenth aspect (10) has a length to width ratio in a range of 1.1 to 2.5.

In a twelfth aspect (12), the rectangular-cuboid volume according to the tenth aspect (10) has a width to length ratio in a range of 1.1 to 2.5.

In a thirteenth aspect (13), the plurality of interconnected unit cells according to any one of aspects (1)-(12) each include: a number of forwardly-oriented struts, and a number of rearwardly-oriented struts different from the number of forwardly-oriented struts.

In a fourteenth aspect (14), the plurality of interconnected unit cells according to any one of aspects (1)-(13) each include: a number of medially-oriented struts, and a number of laterally-oriented struts different from the number of medially-oriented struts.

In a fifteenth aspect (15), the plurality of interconnected unit cells according to any one of aspects (1)-(12) each include: a number of forwardly-oriented struts, a number of rearwardly-oriented struts, a number of medially-oriented struts, and a number of laterally-oriented struts, where a total number of the forwardly-oriented struts plus the rearwardly-oriented struts is different from a total number the medially-oriented struts plus the laterally-oriented struts.

In a sixteenth aspect (16), the plurality of interconnected unit cells according to any one of aspects (1)-(12) each include: a forwardly-oriented strut having a first cross-sectional shape and a rearwardly-oriented strut having a second cross-sectional shape different from the first cross-sectional shape.

In a seventeenth aspect (17), the plurality of interconnected unit cells according to any one of aspects (1)-(12) each include: a medially-oriented strut having a first cross-sectional shape and a laterally-oriented strut having a second cross-sectional shape different from the first cross-sectional shape.

In an eighteenth aspect (18), the sole according to any one of aspects (1)-(17) further includes a second mechanically anisotropic region including: a third lattice shear modulus measured in the first direction, and a fourth lattice shear modulus different from the third lattice shear modulus and measured in the second direction.

In a nineteenth aspect (19), the first direction according to the eighteenth aspect (18) is a forward direction pointing away from a heel end of the sole, and the second direction according to the eighteenth aspect (18) is a rearward direction pointing toward the heel end of the sole.

In a twentieth aspect (20), the sole according to any one of aspects (1)-(17) further includes a second mechanically anisotropic region including: a third lattice shear modulus measured in a third direction, and a fourth lattice shear modulus different from the third lattice shear modulus and measured in a fourth direction opposite the third direction.

In a twenty-first aspect (21), the third direction according to the twentieth aspect (20) is a medial direction pointing away from a lateral side of the sole, and the fourth direction according to the twentieth aspect (20) is a lateral direction pointing toward the lateral side of the sole.

A twenty-second aspect (22) of the present application is directed to a method of making a sole for an article of footwear, the method including: 3-D printing a three-dimensional mesh for the sole including a plurality of interconnected unit cells, each interconnected unit cell having a plurality of struts defining a three-dimensional shape and a plurality of nodes at which one or more struts are connected, where 3-D printing the three-dimensional mesh includes: printing a set of interconnected unit cells that define a mechanically anisotropic region including anisotropic lattice shear moduli in the three-dimensional mesh.

In a twenty-third aspect (23), printing the set of interconnected unit cells according to the twenty-second aspect (22) includes printing struts having a first effective diameter and printing struts having a second effective diameter different from the first effective diameter, where struts having the first effective diameter are oriented in a first direction and the struts having the second effective diameter are oriented in a second direction different from the first direction.

In a twenty-fourth aspect (24), the first direction according to the twenty-third aspect (23) is forwardly-oriented and the second direction according to the twenty-third aspect (23) is rearwardly-oriented.

In a twenty-fifth aspect (25), printing the set of interconnected unit cells according to any one of aspects (22)-(24) includes printing individual unit cells each occupying a rectangular-cuboid volume.

In a twenty-sixth aspect (26), printing the set of interconnected unit cells according to any one of aspects (22)-(25) includes printing a plurality of unit cells with a number of forwardly-oriented struts and a number of rearwardly-oriented struts different from the number of forwardly-oriented struts.

In a twenty-seventh aspect (27), printing the set of interconnected unit cells according to any one of aspects (22)-(26) includes printing a plurality of unit cells with a number of medially-oriented struts and a number of laterally-oriented struts different from the number of forwardly-oriented struts.

In a twenty-eighth aspect (28), printing the set of interconnected unit cells according to any one of aspects (22)-(27) includes printing struts having a first cross-sectional shape and printing struts having a second cross-sectional shape different from the first cross-sectional shape, where the struts having the first cross-sectional shape are oriented in a first direction and the struts having the second cross-sectional shape are oriented in a second direction opposite to or orthogonal to the first direction.

In a twenty-ninth aspect (29), the first direction according to the twenty-eighth aspect (28) is forwardly-oriented and the second direction according to the twenty-eighth aspect (28) is rearwardly-oriented.

In a thirtieth aspect (30), the method according to any one of aspects (22)-(29) further includes: collecting biometric data including a map of stresses including a first zone having a first average vertical load and a second zone having a second average vertical load less than the first average vertical load; and 3-D printing the three-dimensional mesh includes printing the set of interconnected unit cells in a first location of the three-dimensional mesh corresponding to the first zone in the map of stresses.

In a thirty-first aspect (31), the method according to the thirtieth aspect (30) further includes printing a second set of interconnected unit cells that define a second mechanically anisotropic region including anisotropic lattice shear moduli in a second location of the three-dimensional mesh corresponding to the second zone in the map of stresses.

DETAILED DESCRIPTION

Figure 1:
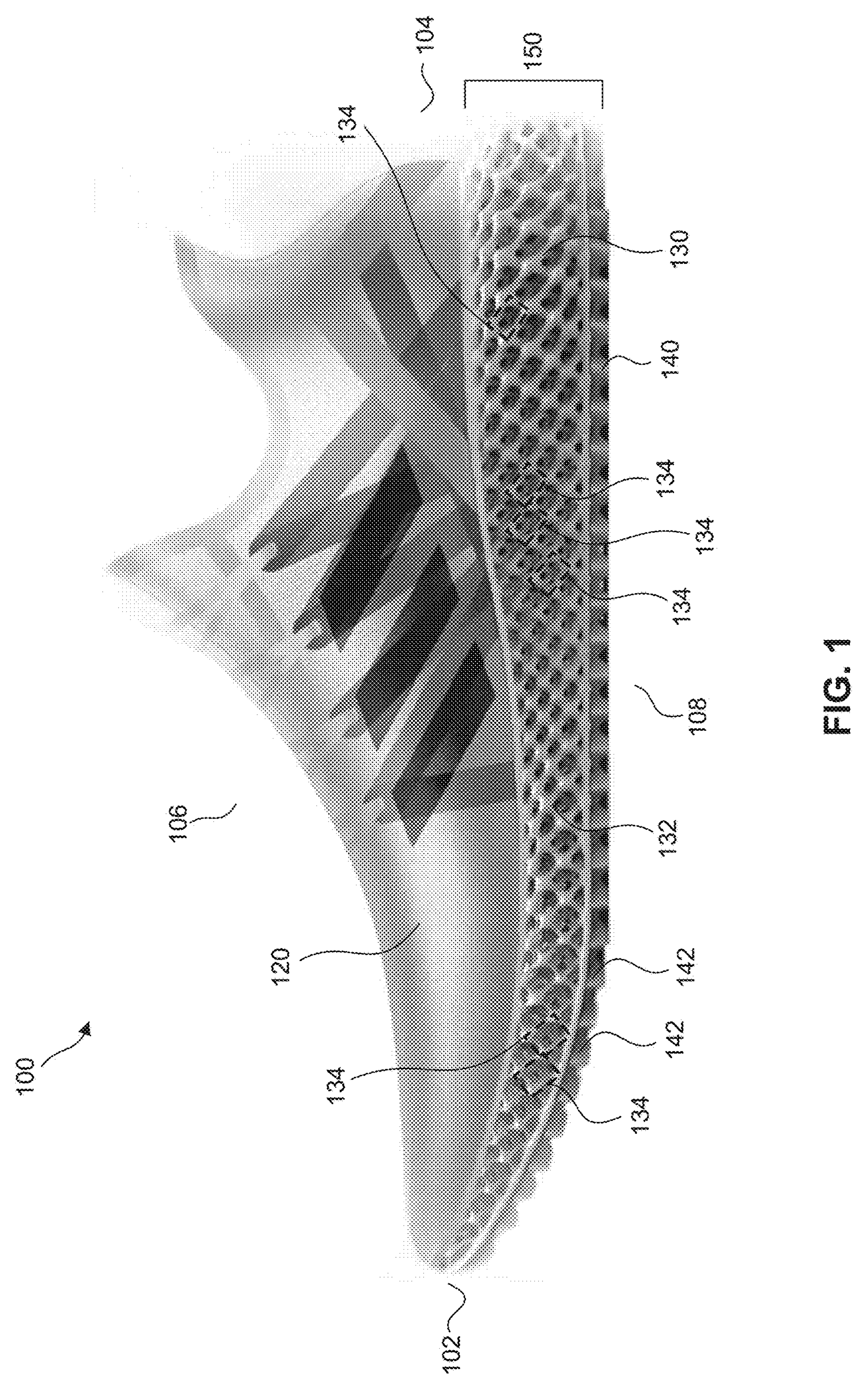
FIG. 1 is a side view of an article of footwear according to some embodiments.

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An article of footwear has many purposes. Among other things, an article of footwear may cushion a wearer's foot, support a wearer's foot, protect a wearer's foot (e.g., from injury), and optimize the performance of a wearer's foot. Each of these purposes, alone or in combination, provides for a comfortable article of footwear suitable for use in a variety of scenarios (e.g., exercise and every day activities). The features of an article of footwear (e.g., shape, components, and materials used to make footwear) may be altered to produce desired characteristics, for example, cushioning, support, stability, ride, and propulsion characteristics.

Stability provided by an article of footwear may protect a wearer's foot from injury, such as spraining his or her ankle. Propulsion provided by an article of footwear may optimize the performance of a wearer's foot by, for example, maximizing the energy transfer from the individual's foot to the surface his or her foot is in contact with (e.g., the ground) via the article of footwear. Maximizing the energy transfer between the individual's foot and a surface (i.e., reducing energy lost via and/or absorbed by an article of footwear) may help an athlete, for example, accelerate faster, maintain a higher maximum speed, change directions faster, and jump higher. Cushioning and ride characteristics provided by an article of footwear may provide comfort for an individual during an athletic or everyday activity.

The anatomy of the human foot creates a shape and contour for the bottom of the foot that results in varying degrees of pressure (force) on the bottom of the foot when the foot is in contact with the ground (e.g., while standing still, walking, running, etc.). The varying degrees of pressure create areas on the foot subject various pressure forces and stresses. Some areas may be subject to relatively high pressures/stresses and others may be subject to relatively low pressures/stresses. To provide comfort, areas subject to relatively high degrees of pressure/stress may require additional cushioning or support compared to areas subject to relatively low degrees of pressure/stress.

Moreover, the shape and contour of the bottom of different individuals' feet create different pressure/stress profiles for different individuals' feet. This may also be true for the left and right foot of a single individual. Accordingly, the cushioning and/or support needs for one individual's feet (or the left and right feet of a single individual) may be different. The cushioning and/or support needs may be dependent not only on an individual's foot anatomy, but also the individual's natural gait.

Three-dimensional meshes described herein leverage characteristics of unit cells and/or struts that make up the three-dimensional meshes to create mechanically anisotropic properties. These mechanically anisotropic properties can be designed to provide desired mechanical characteristics across a three-dimensional mesh, for example a three-dimensional mesh defining all or a portion of a sole. One such property that can be designed to achieve specific mechanical characteristics is "lattice shear modulus." In some embodiments, all or a portion of a three-dimensional mesh may be designed to include anisotropic lattice shear moduli that impart desired mechanical characteristics to the three-dimensional mesh. In some embodiments, a plurality of regions of a three-dimensional mesh may be designed to include anisotropic lattice shear moduli that impart desired mechanical characteristics to the different regions of the three-dimensional mesh. Other exemplary properties that can be designed to achieve specific mechanical characteristics include, but are not limited to, compressive strength and bend strength. Desired mechanical characteristics for a three-dimensional mesh may in turn create desired footwear sole characteristics, for example, cushioning, propulsion, stability, ride, and/or weight.

As used herein, the term "three-dimensional mesh" means a three-dimensional structure comprising interconnected structural members defining a plurality of unit cells. The structural members, and thus the unit cells, can be connected at nodes. The unit cells can be arranged in a lattice configuration. For example, the interconnected structural members can be struts that are connected at nodes and that define unit cells arranged in a lattice configuration. Exemplary lattice configurations include, but are not limited to basic cubic lattices, body-centered cubic lattices, face-centered cubic lattices, and modified lattices based on these lattice types.

As used herein, the term "lattice shear modulus" means the shear modulus (slope of the shear stress versus shear strain curve in the elastic region) for a three-dimensional mesh. A "lattice shear modulus" as described herein is measured using the following solid model simulation. A 7×7×2 unit cell puck composed of unit cells for the three-dimensional mesh is modeled using FEA (finite element analysis) modeling software. Suitable FEA modeling software includes Abaqus FEA modeling software. The 7×7×2 unit cell puck includes two layers of seven longitudinal rows of seven unit cells arranged adjacent to each other in the transverse direction as described herein. The unit cell puck is modeled as being sandwiched between and in contact with a top plate and a bottom plate. The following parameters were input into the FEA modeling software for the simulation: (1) material characteristics of the modeled struts for the unit cell puck (including density and tensile properties), (2)

the loading conditions, and (3) the contact mechanics between the unit cell puck and the two plates (including the frictional properties).

Lattice shear moduli of the 7×7×2 unit cell puck in different directions is determined by a shear simulation with 45-degree load in the direction in which the lattice shear modulus is being evaluated. To determine the lattice shear modulus in a forward longitudinal direction, a 45-degree load in the forward longitudinal direction is modeled. To determine the lattice shear modulus in a rearward longitudinal direction, a 45-degree load in the rearward longitudinal direction is modeled. To determine the lattice shear modulus in a medial transverse direction, a 45-degree load in the medial transverse direction is modeled. To determine the lattice shear modulus in a lateral transverse direction, a 45-degree load in the lateral transverse direction is modeled.

The modeled stress-strain behavior of the 7×7×2 unit cell puck is plotted and the lattice shear modulus in the different directions is calculated by measuring the slope of the stress-strain curve in the elastic deformation region in the plot.

As used herein, "anisotropic" means dependent on direction. "Isotropic" generally means independent of direction. A material or component with a particular property that is isotropic at a particular point would have that same property regardless of measurement direction. For example, if Young's modulus is isotropic at a point, the value of the Young's modulus is the same regardless of the stretching direction used to measure Young's modulus.

As used herein, "mechanical properties" refers to the stiffness matrix of a material or component, properties that can be derived from the stiffness matrix, or measured mechanical properties of a material or component. Young's or elastic modulus (E), Poisson's ratio (v) and shear modulus (G), compressive strength, and bend strength, which may or may not depend on direction at a particular point, are examples of such properties. An isotropic material or component has 2 independent elastic constants, often expressed as the Young's modulus and Poison's ratio of the material (although other ways to express may be used), which do not depend on position in such a material or component. A fully anisotropic material or component has 21 independent elastic constants. An orthotropic material or component has 9 independent elastic constants.

Orthotropic materials or components are a sub-set of anisotropic materials or components. By definition, an orthotropic material or component has at least two orthogonal planes of symmetry where material properties are independent of direction within each plane. An orthotropic material or component has nine independent variables (i.e. elastic constants) in its stiffness matrix. An anisotropic material or component can have up 21 elastic constants to define its stiffness matrix, if the material or component completely lacks planes of symmetry.

The mechanically anisotropic characteristic(s) of midsoles disclosed herein may offer a multitude of different options for customizing (tailoring) a midsole to an individual's, or group of individuals' needs. For example, lattice shear moduli may vary between different zones or portions on a midsole to provide desired characteristics (e.g., cushioning, support, stability, ride, and/or propulsion characteristics) for an individual, or group of individuals.

The midsoles, and articles of footwear having midsoles discussed herein, may include a three-dimensional mesh composed of interconnected unit cells. The geometry, interconnection, and arrangement of the interconnected unit cells may be customized for a particular individual, or group of individuals. The geometry, interconnection, and arrangement of the interconnected unit cells may be based, in whole or in part, on a biometric data profile for an individual's foot.

Midsoles including a three-dimensional mesh as discussed herein may be manufactured using one or more additive manufacturing methods. Additive manufacturing methods allow for fabrication of three-dimensional objects without the need for a mold. Instead, the objects may be manufactured layer by layer, e.g. from liquid material, or from a powder material. Additive manufacturing methods may reduce costs for a manufacturer, and in turn a consumer, of a product (e.g., a shoe) by reducing or eliminating the need for molds. Integral manufacturing of a midsole using additive manufacturing may make the assembly of separate elements of the midsole unnecessary. Similarly, an additively manufactured midsole may be fabricated from single material, which may facilitate easy recycling of the midsole.

Also, since molds may not be required, additive manufacturing methods facilitate customization of products. For example, a midsole can be customized to a particular individual, or group of individuals, in a more cost effective way with an additive manufacturing method compared to a traditional molding method.

Due to the nature of additive manufacturing methods, additive manufacturing methods can be leveraged to provide customized and affordable footwear for individuals. Exemplary additive manufacturing techniques include for example, selective laser sintering, selective laser melting, selective heat sintering, stereo lithography, or fused deposition modeling. Various additive manufacturing techniques related to articles of footwear are described for example in US 2009/0126225, WO 2010/126708, US 2014/0300676, US 2014/0300675, US 2014/0299009, US 2014/0026773, US 2014/0029030, WO 2014/008331, WO 2014/015037, US 2014/0020191, EP 2 564 719, EP 2 424 398, and US 2012/0117825. In some embodiments, the additive manufacturing process can include a continuous liquid interface production process. For example, the additive manufacturing process can include a continuous liquid interface production process as described in U.S. Pat. No. 9,453,142, issued on Sep. 27, 2016, which is hereby incorporated in its entirety by reference thereto.

In some embodiments, 3-D printing a three-dimensional mesh can include 3-D printing the mesh in an intermediate green state, shaping the mesh in the green state, and curing the green mesh in its final shape.

Techniques for producing an intermediate object from resins by additive manufacturing are known. Suitable techniques include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (Oct. 18, 2016). Other examples of methods and apparatus for carrying out particular embodiments of CLIP include, but are not limited to: Batchelder et al., US Patent Application Pub. No. US 2017/0129169 (May 11, 2017); Sun and Lichkus, US Patent Application Pub. No. US 2016/0288376 (Oct. 6, 2016); Willis et al., US Patent Application Pub. No. US 2015/0360419 (Dec. 17, 2015); Lin et al., US Patent Application Pub. No. US 2015/0331402 (Nov. 19, 2015); D. Castanon, US Patent Application Pub. No. US 2017/0129167 (May 11, 2017). B. Feller, US Pat App. Pub. No. US 2018/0243976 (published Aug. 30, 2018); M. Panzer and J. Tumbleston, US Pat App Pub. No. US 2018/0126630 (published May 10, 2018); K. Willis and B. Adzima, US Pat App Pub. No. US 2018/0290374 (Oct. 11, 2018) L. Robeson et al., PCT Patent Pub. No. WO 2015/164234 (see also U.S. Pat. Nos. 10,259,171 and 10,434,706); and C. Mirkin et al., PCT Patent Pub. No. WO 2017/210298 (see also US Pat. App. US 2019/0160733). The disclosures of these patents and applications are incorporated by reference herein in their entirety.

While stereolithography techniques such as CLIP can be preferred, it will be appreciated that other additive manufacturing techniques, such as jet printing (see, e.g., U.S. Pat. No. 6,259,962 to Gothait and US Patent App. Ser. No. US 2020/0156308 to Ramos et al.) can also be used.

Using the additive manufacturing methods discussed herein, customized midsoles may be provided with short lead times. For example, a midsole may be customized for, among other things, the width and/or length of an individual's foot, the weight of an individual, an individual's gait, and/or the type of footwear with which a midsole is intended to be used. In some embodiments, midsoles discussed herein may be formed using an additive manufacturing method that does not require post-formation processing steps, such as cutting away undesirable parts of a midsole. Eliminating post-formation processing steps can facilitate manufacturing consistency and reproducibility.

In some embodiments, a midsole may include a region having mechanically anisotropic properties designed for a particular individual's, or group of individuals', footwear wants or needs. Examples of specific footwear wants or needs include, but are not limited to, propelled forward under compression, comfortable step in, and stiff to lateral loading. In some embodiments, a midsole may include at least two regions having different mechanically anisotropic properties designed for a particular individual's, or group of individuals', footwear wants or needs. In some embodiments, a midsole may comprise at least two regions that have different mechanically anisotropic properties.

In some embodiments, a midsole may include a region having mechanically orthotropic properties designed for a particular individual's, or group of individuals', footwear wants or needs. In some embodiments, a midsole may include at least two regions having different mechanically orthotropic properties designed for a particular individual's, or group of individuals', footwear wants or needs. In some embodiments, a midsole may comprise at least two regions that have different mechanically orthotropic properties.

In some embodiments, a midsole may include a first mechanically isotropic region and a second region having mechanically anisotropic properties designed for a particular individual's, or group of individuals', footwear wants or needs. In some embodiments, a midsole may include a first mechanically isotropic region and a second region having mechanically orthotropic properties designed for a particular individual's, or group of individuals', footwear wants or needs.

Three-dimensional meshes described herein may have a lattice shear modulus that is different in one or more of a forward direction, a rearward direction, a medial direction, and a lateral direction. In some embodiments, three-dimensional meshes described herein may have lattice shear moduli that are different in two or more of a forward direction, a rearward direction, a medial direction, and a lateral direction. In some embodiments, three-dimensional meshes described herein may have lattice shear moduli that are different in three of a forward direction, a rearward direction, a medial direction, and a lateral direction. In some embodiments, three-dimensional meshes described herein may have lattice shear moduli that are different in each of a forward direction, a rearward direction, a medial direction, and a lateral direction.

In some embodiments, three-dimensional meshes described herein may include one or more regions having a lattice shear modulus that is different in one or more of a forward direction, a rearward direction, a medial direction, and a lateral direction. In some embodiments, three-dimensional meshes described herein may include one or more regions having lattice shear moduli that are different in two or more of a forward direction, a rearward direction, a medial direction, and a lateral direction. In some embodiments, three-dimensional meshes described herein may include one or more regions having lattice shear moduli that are different in three of a forward direction, a rearward direction, a medial direction, and a lateral direction. In some embodiments, three-dimensional meshes described herein may include one or more regions having lattice shear moduli that are different in each of a forward direction, a rearward direction, a medial direction, and a lateral direction. Different regions of a three-dimensional mesh may have the same or different lattice shear moduli.

In some embodiments, three-dimensional meshes, or a region thereof, may have a lattice shear modulus that is the same in a forward direction and a rearward direction. In some embodiments, three-dimensional meshes, or a region thereof, may have a lattice shear modulus that is the same in a medial direction and a lateral direction. For example, in some embodiments, three-dimensional meshes, or a region thereof, may have lattice shear moduli that are the same in a forward direction and a rearward direction but different in a medial direction and a lateral direction. As another example, in some embodiments, three-dimensional meshes, or a region thereof, may have lattice shear moduli that are the same in a medial direction and a lateral direction but different in a forward direction and a rearward direction.

In some embodiments, a three-dimensional mesh may have anisotropic lattice shear moduli in forward and rearward directions as described herein. In some embodiments, one or more regions of a three-dimensional mesh may have anisotropic lattice shear moduli in forward and rear directions as described herein. In some embodiments, the lattice shear modulus in the forward direction may be greater than the lattice shear modulus in the rearward direction. In some embodiments, the lattice shear modulus in the forward direction may be less than the lattice shear modulus in the rearward direction.

By tailoring the lattice shear modulus in the forward direction to be greater than or less than the lattice shear modulus in the rearward direction, a sole can be designed to have desired characteristics when acted on by forward and rearward forces during use. For example, a lattice shear modulus in the rearward direction can be designed to be relatively stiff to provide propulsion while an athlete is accelerating in a forward direction (which applies a significant rearward force on a sole). As another example, a lattice shear modulus in the forward direction can be designed to be relatively flexible to provide support and/or cushion during a heel strike or while an athlete is deaccelerating (both of which can apply a significant forward force on a sole).

In some embodiments, by designing a three-dimensional mesh in this fashion, the three-dimensional mesh can convert vertical loading energy into forward displacement, which propels a wearer's foot forward when a sole including the three-dimensional mesh contacts the ground during use. In other words, by designing a three-dimensional mesh in this fashion, the three-dimensional mesh can be predisposed to deform forwards when a sole including the three-dimensional mesh contacts the ground during use. The opposite result can be achieved by tailoring the lattice shear modulus in the forward direction to be less than or less than the lattice shear modulus in the rearward direction.

A three-dimensional mesh predisposed to deform in a particular direction (for example, in a forward direction) can offer multiple advantages for a wearer. For example, forward motion created by the three-dimensional mesh can yield improved efficiency while running. In other words, a three-dimensional mesh predisposed to deform forward can reduce the energy a wearer is required expend to continue his or her forward motion. As another example, a three-dimensional mesh predisposed to deform laterally (for example medially) can improve efficiency when a wearer changes direction by providing additional support under typical lateral loading conditions associated with, for example a lateral or medial cut during running.

In some embodiments, a three-dimensional mesh may have anisotropic lattice shear moduli in medial and lateral directions as described herein. In some embodiments, one or more regions of a three-dimensional mesh may have anisotropic lattice shear moduli in medial and lateral directions as described herein. In some embodiments, the lattice shear modulus in the medial direction may be greater than the lattice shear modulus in the lateral direction. In some embodiments, the lattice shear modulus in the medial direction may be less than the lattice shear moduli in the lateral direction.

By tailoring the lattice shear modulus in the medial direction to be greater than or less than the lattice shear modulus in the lateral direction, a sole can be designed to have desired characteristics when acted on by medial and lateral forces during use. For example, a lattice shear modulus in the medial direction can be designed to be relatively stiff to provide support for an individual who prefers a high amount of strength for lateral movements (e.g., cuts) that apply relatively high medial forces on a sole. As another example, a lattice shear modulus in the lateral direction can be designed to be relatively stiff to provide support for an individual who prefers a high amount of strength for lateral movements (e.g., cuts) that apply relatively high lateral forces on a sole.

In some embodiments, a three-dimensional mesh may have anisotropic lattice shear moduli in longitudinal and transverse directions as described herein. In some embodiments, one or more regions of a three-dimensional mesh may have anisotropic lattice shear moduli in longitudinal and transverse directions as described herein. In some embodiments, the lattice shear modulus in a longitudinal direction may be greater than the lattice shear modulus in a transverse direction. In some embodiments, the lattice shear modulus in a longitudinal direction may be less than the lattice shear modulus in a transverse direction.

By tailoring the lattice shear modulus in a longitudinal direction to be greater than or less than the lattice shear modulus in a transverse direction, a sole can be designed to have desired characteristics when acted on by longitudinal and transverse forces during use. For example, lattice shear moduli in medial and lateral transverse directions can be designed to be relatively stiff compared to either a lattice shear modulus in a forward and/or rearward direction to provide support for an athlete while changing directions. As another example, lattice shear moduli in medial, lateral, and rearward directions can be designed to be relatively stiff compared to a lattice shear modulus in a forward direction to provide support and propulsion for an athlete while also providing cushioning.

These same anisotropic lattice shear moduli relationships can also be applied to different regions of a sole. For example, the lattice shear moduli of a medial forefoot region and a lateral heel region could be greater than other regions of a sole. This configuration could help prevent overpronation in the heel while also countering lateral forces in the forefoot while changing directions.

Figure 2:
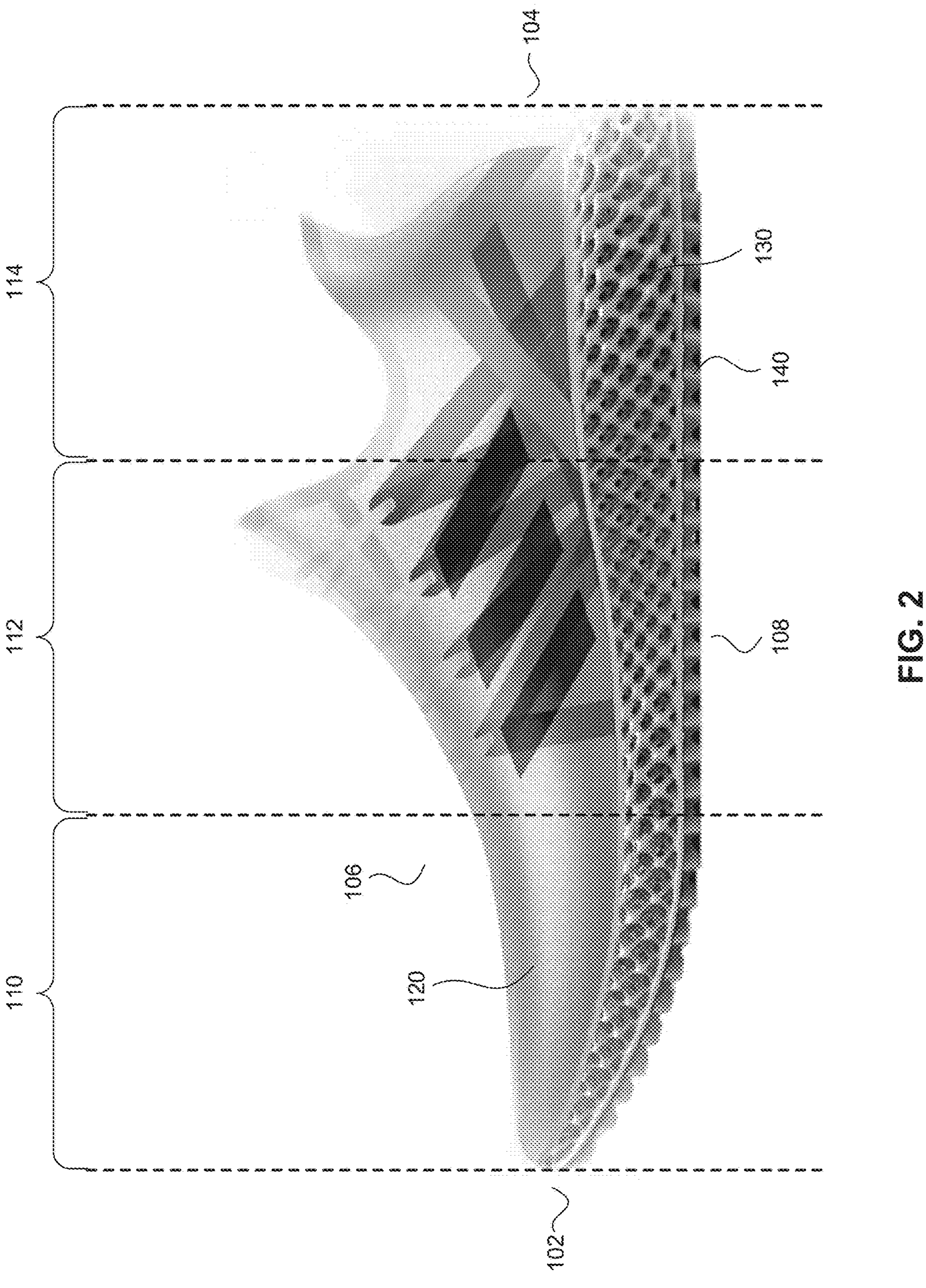
FIG. 2 is a side view of an article of footwear according to some embodiments showing portions of the article of footwear.

FIGS. 1 and 2 show an article of footwear 100 according to some embodiments. Article of footwear 100 may include an upper 120 coupled to a midsole 130. Article of footwear 100 includes a forefoot end 102, a heel end 104, a medial side 106, and a lateral side 108 opposite medial side 106. Also, as shown for example in FIG. 2, article of footwear 100 includes a forefoot portion 110, a midfoot portion 112, and a heel portion 114. Portions 110, 112, and 114 are not intended to demarcate precise areas of article of footwear 100. Rather, portions 110, 112, and 114 are intended to represent general areas of article of footwear 100 that provide a frame of reference. Although portions 110, 112, and 114 apply generally to article of footwear 100, references to portions 110, 112, and 114 also may apply specifically to upper 120 or midsole 130, or individual components of upper 120 or midsole 130.

In some embodiments, article of footwear 100 may include an outsole 140 coupled to midsole 130. Together, midsole 130 and outsole 140 may define a sole 150 of article of footwear 100. In some embodiments, outsole 140 may be directly manufactured (e.g., 3-D printed) on the bottom side of midsole 130. In some embodiments, outsole 140 and midsole 130 may be manufactured in one manufacturing process (e.g., one 3-D printing process) and no bonding, e.g. via adhesives, may be necessary. In some embodiments, outsole 140 may include a plurality of protrusions 142 to provide traction for article of footwear 100. Protrusions 142 may be referred to as tread. Midsole 130 may be any of the midsoles described herein, for example, midsole 300 or midsole 400. Also, midsole 130 may include any of the mechanically anisotropic meshes discussed herein.

As shown for example in FIG. 1, midsole 130 may include a three-dimensional mesh 132 composed of a plurality of interconnected unit cells 134. In some embodiments, midsole 130 may be customized for an individual, or a group of individuals. In such embodiments, an individual's gait may be analyzed using, for example, a Vicon® Motion Capture system with force plates, or a Run Genie® system. Such gait analysis systems may produce a biometric data profile for an individual that may be used to customize midsole 130 (see, for example, method 1000).

Based at least in part on the data collected, properties of midsole 130, three-dimensional mesh 132, and/or unit cells 134 may be customized to an individual's needs or wants, for example, cushioning, support, stability, ride, and/or propulsion needs or wants. In some embodiments, midsole 130, three-dimensional mesh 132, and/or unit cells 134 may be customized based on an individual's athletic needs (for example, the type of sport the individual plays and/or the amount of time the individual spends exercising).

In some embodiments, midsole 130 may be customized to a particular individual's foot or gait, or a particular group of individual's feet or gait. This customization may be based on unique user characteristics provided by, for example, a Run Genie® system. In some embodiments, midsole 130 may be customized for an individual to modify an irregularity in the individual's gait. In such embodiments, midsole 130 may provide stability and/or propulsion characteristics to modify the individual's gait (i.e., modify his or her gait to a preferred motion). Correcting/modifying an individual's gait to preferred motion may reduce discomfort for an individual during exercise.

In some embodiments, different zones or portions of midsole 130 (e.g., portions 110, 112, and 114) may be customized or tuned to a particular individual's foot or gait, or a particular group of individual's feet or gait. Different zones or portions of midsole 130 may customized to an individual's gait by design the zones to have anisotropic shear lattice moduli as discussed herein.

Upper 120 and sole 150 may be configured for a specific type of footwear, including, but not limited to, a running shoe, a hiking shoe, a water shoe, a training shoe, a fitness shoe, a dancing shoe, a biking shoe, a tennis shoe, a cleat (e.g., a baseball cleat, a soccer cleat, or a football cleat), a basketball shoe, a boot, a walking shoe, a casual shoe, or a dress shoe. Moreover, sole 150 may be sized and shaped to provide a desired combination of cushioning, stability, propulsion, and ride characteristics to article of footwear 100. The term "ride" may be used herein in describing a sense of smoothness or flow occurring during a gait cycle including heel strike, midfoot stance, toe off, and the transitions between these stages. In some embodiments, sole 150 may provide particular ride features including, but not limited to, appropriate control of pronation and supination, support of natural movement, support of unconstrained or less constrained movement, appropriate management of rates of change and transition, and combinations thereof.

Sole 150 and portions thereof (e.g., midsole 130 and outsole 140) may comprise material(s) for providing desired cushioning, ride, propulsion, support, and stability. Suitable materials for sole 150 (e.g., midsole 130 and/or outsole 140) include, but are not limited to, a foam, a rubber, ethyl vinyl acetate (EVA), thermoplastic polyurethane (TPU), expanded thermoplastic polyurethane (eTPU), polyether block amide (PEBA), expanded polyether block amide (ePEBA), thermoplastic rubber (TPR), and a thermoplastic polyurethane (PU). In some embodiments, the foam may comprise, for example, an EVA based foam or a PU based foam and the foam may be an open-cell foam or a closed-cell foam. In some embodiments, midsole 130 and/or outsole 140 may comprise elastomers, thermoplastic elastomers (TPE), foam-like plastics, gel-like plastics, and combinations thereof. In some embodiments, midsole 130 and/or outsole 140 may comprise polyolefins, for example polyethylene (PE), polystyrene (PS) and/or polypropylene (PP). In some embodiments, sole 150 may include a shank or torsion bar. In such embodiments, the shank or torsion bar may be made of a Nylon polymer.

The above-mentioned materials for sole 150 may be recycled materials, which could be for example reclaimed polymer material. Reclaimed polymer material could be any suitable plastic material, for example TPU, PEBA, PE, PS, PP etc. In some embodiments, more than 50%, or more than 90% reclaimed material may be used for midsole 130 and/or outsole 140.

Sole 150 and portions thereof (e.g., midsole 130 and outsole 140) may be formed using an additive manufacturing process, including, but not limited to, selective laser sintering, selective laser melting, selective heat sintering, stereo lithography, or fused deposition modeling etc. In some embodiments, midsole 130 and/or outsole 140 may be formed using an additive manufacturing process including a continuous liquid interface production process. For example, the continuous liquid interface production process described in U.S. Pat. No. 9,453,142, issued on Sep. 27, 2016, which is hereby incorporated in its entirety by reference thereto. In some embodiments, midsole 130 and outsole 140 may be formed as a single piece via an additive manufacturing process. In such embodiments, midsole 130 and outsole 140 may be a single integrally formed piece.

In some embodiments, outsole 140 may be formed by injection molding, blow molding, compression molding, rotational molding, or dipping. In such embodiments, midsole 130 and outsole 140 may be discrete components that are formed separately and attached. In some embodiments, midsole 130 may be attached to outsole 140 via, for example, but not limited to, adhesive bonding, stitching, welding, or a combination thereof. In some embodiments, midsole 130 may be attached to outsole 140 via an adhesive disposed between midsole 130 and outsole 140. Similarly, midsole 130 may be attached to upper 120 via, for example, but not limited to, adhesive bonding, stitching, welding, or a combination thereof.

Figure 3A:
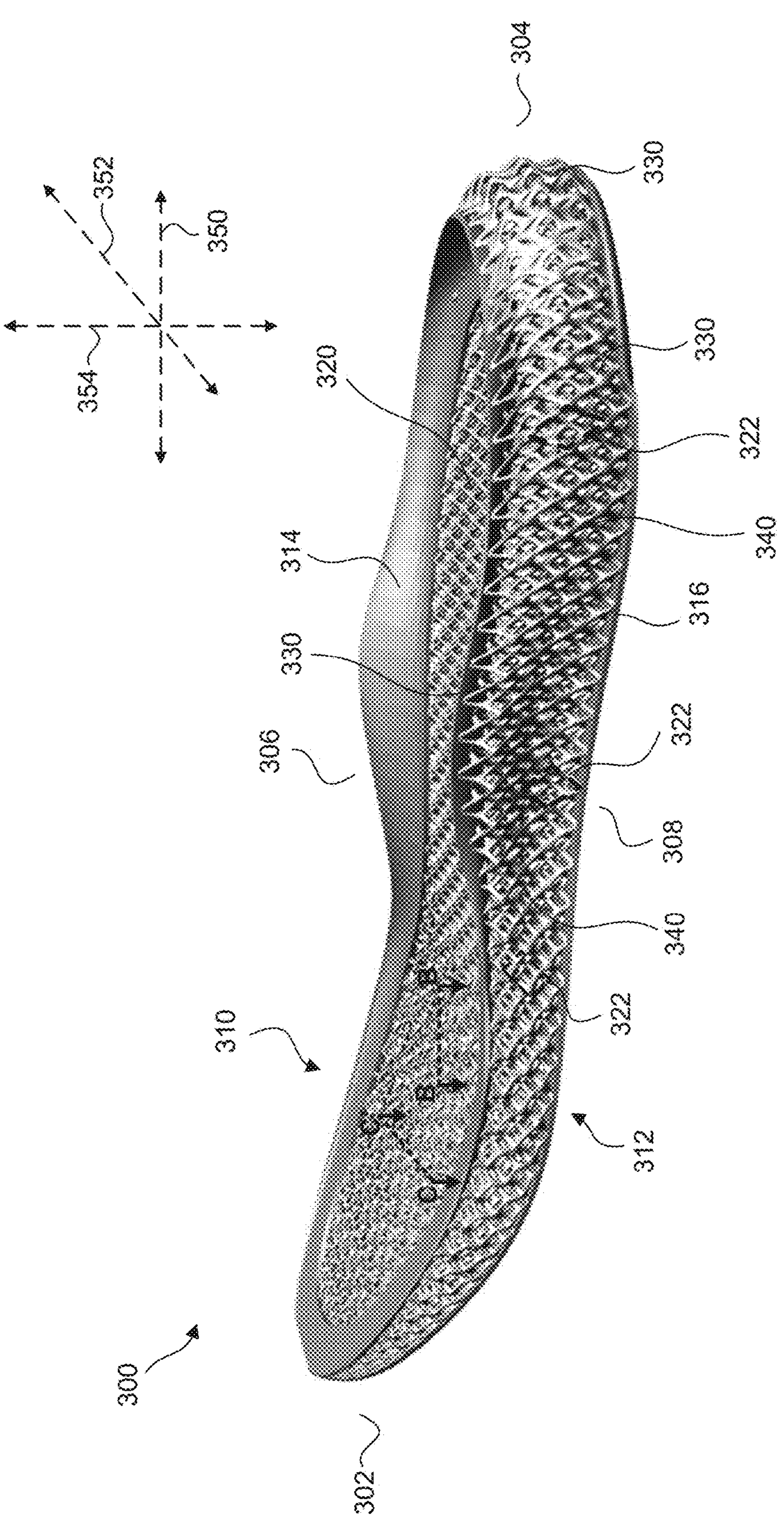
FIG. 3A is a perspective view of a midsole according to some embodiments.

FIG. 3A shows a midsole 300 according to some embodiments. Midsole 300 includes a forefoot end 302, a heel end 304, a medial side 306, a lateral side 308, a top side 310, and a bottom side 312. A longitudinal direction 350 of midsole 300 extends between forefoot end 302 and heel end 304. Longitudinal direction 350 includes a forward longitudinal direction ("forward direction") extending from heel end 304 to forefoot end 302 and a rearward longitudinal direction ("rearward direction") extending from forefoot end 302 to heel end 304. A transverse direction 352 of midsole 300 extends between medial side 306 and lateral side 308 of midsole 300. Transverse direction 352 includes a medial transverse direction ("medial direction") extending from lateral side 308 to medial side 306 and a lateral transverse direction ("lateral direction") extending from medial side 306 to lateral side 308. A vertical direction 354 of midsole 300 extends between top side 310 and bottom side 312 of midsole 300. Vertical direction 354 includes an upward vertical direction ("upward direction") extending from bottom side 312 to top side 310 and a downward vertical direction ("downward direction") extending from top side 310 to bottom side 312. Top side 310 may be considered an "upper-facing side" and bottom side 312 may be considered a "ground-facing side."

Midsole 300 may be defined, in whole or in part, by a three-dimensional mesh 320. For example, in some embodiments, three-dimensional mesh 320 may define one or more of a forefoot portion 110 of midsole 300, a midfoot portion 112 of midsole 300, and/or a heel portion 114 of midsole. In some embodiments, three-dimensional mesh 320 may define all or a portion of forefoot portion 110 of midsole 300. In some embodiments, three-dimensional mesh 320 may define all or a portion of midfoot portion 112 of midsole 300. In some embodiments, three-dimensional mesh 320 may define all or a portion of heel portion 114 of midsole 300.

Similar to midsole 300, three-dimensional mesh 320 may be described as having a forefoot end 302, a heel end 304, a medial side 306, a lateral side 308, a top side 310, and a bottom side 312. Unless specified otherwise, a forefoot end 302, heel end 304, medial side 306, lateral side 308, top side 310, and bottom side 312 for a three-dimensional mesh 320 does not necessarily correspond to a forefoot end 302, heel end 304, medial side 306, lateral side 308, top side 310, or bottom side 312 of midsole 300. A forefoot end 302 of three-dimensional mesh 320 refers to a foremost end of three-dimensional mesh 320 and a heel end 304 of three-dimensional mesh 320 refers to a rearmost end of three-dimensional mesh 320. A medial side 306 of three-dimensional mesh 320 refers to a medial-most side of three-dimensional mesh 320 and a lateral side 308 of three-dimensional mesh 320 refers to a lateral-most side of three-dimensional mesh 320. A top side 310 of three-dimensional mesh 320 refers to a topmost side of three-dimensional mesh 320 and a bottom side 312 of three-dimensional mesh 320 refers to a bottommost side of three-dimensional mesh 320.

In some embodiments, midsole 300 may include a rim 314 disposed around all or a portion of the perimeter of top side 310 of midsole 300. In some embodiments, rim 314 may be disposed around all or a portion of the perimeter of medial and lateral sides 306/308 of midsole 300. In embodiments including rim 314, rim 314 may provide stability for the perimeter of midsole 300 and/or may facilitate attachment of midsole 300 to an upper (e.g., upper 120). In some embodiments, an outsole 316 may be coupled to bottom side 312 of midsole 300.

Three-dimensional mesh 320 includes a plurality of interconnected unit cells 322. The interconnected unit cells 322 include a plurality of struts 330 defining a three-dimensional shape of a respective unit cell 322. Each unit cell 322 may have a base geometry defined by the struts 330 of the unit cell 322. As used herein "base geometry" means the base three-dimensional shape, connection, and arrangement of the struts 330 defining a unit cell 322. The base geometry of a unit cell 322 may be, but is not limited to, a dodecahedron (e.g., rhombic), a tetrahedron, an icosahedron, a cube, a cuboid, a prism, or a parallelepiped. Unit cells 322 may have any of the characteristics of unit cell 900 described in reference to FIG. 9.

A plurality of struts 330 of three-dimensional mesh 320 are connected at nodes 340. The number of struts 330 that are connected at a node 340 is the "valence number" of the node 340. For example, if four struts 330 are connected at a node 340, that node 340 has a valence of four. In some embodiments, nodes 340 may have a valence number in the range of two to twelve. For example, a node 340 may have a valence number of two, three, four, five, six, seven, eight, nine, ten, eleven, or twelve.

Three-dimensional mesh 320 may include one or more mechanically anisotropic regions. A three-dimensional mesh 320 with one or more mechanically anisotropic regions may define all or a portion of a forefoot portion 110 of midsole 300, a midfoot portion 112 of midsole 300, and/or a heel portion 114 of midsole. In some embodiments, a mechanically anisotropic region may define all or a portion of forefoot portion 110 of midsole 300. In some embodiments, a mechanically anisotropic region may define all or a portion of midfoot portion 112 of midsole 300. In some embodiments, a mechanically anisotropic region may define all or a portion of heel portion 114 of midsole 300.

A mechanically anisotropic region of three-dimensional mesh 320 may have a first lattice shear modulus measured in a first direction and a second lattice shear modulus different from the first lattice shear modulus and measured in a second direction opposite to or orthogonal to the first direction. In some embodiments, the second direction may be opposite the first direction. In some embodiments, the second direction may be orthogonal to the first direction. In some embodiments, a mechanically anisotropic region of three-dimensional mesh 320 may have a third lattice shear modulus measured in a third direction and a fourth lattice shear modulus different from the third lattice shear modulus and measured in a fourth direction opposite to or orthogonal to the third direction. In some embodiments, the fourth direction may be opposite the third direction. In some embodiments, the fourth direction may be orthogonal to the third direction.

As used herein, unless specified otherwise, references to "first," "second," "third," "fourth," etc. are not intended to denote order, or that an earlier-numbered feature is required for a later-numbered feature. Also, unless specified otherwise, the use of "first," "second," "third," "fourth," etc. does not necessarily mean that the "first," "second," "third," "fourth," etc. features have different properties or values.

In some embodiments, three-dimensional mesh 320 may include at least two mechanically anisotropic regions. In some embodiments, a second mechanically anisotropic region may have a third lattice shear modulus measured in a first direction and a fourth lattice shear modulus different from the third lattice shear modulus and measured in a second direction. In some embodiments, a second mechanically anisotropic region may have a third lattice shear modulus measured in a third direction and a fourth lattice shear modulus different from the third lattice shear modulus and measured in a fourth direction. Additional mechanically anisotropic regions may similarly have differing lattice shear moduli measured in the first, second, third, and/or fourth directions.

In some embodiments, a second lattice shear modulus of a mechanically anisotropic region of three-dimensional mesh 320 may be different from a first lattice shear modulus by 10% or more. In some embodiments, a second lattice shear modulus of a mechanically anisotropic region of three-dimensional mesh 320 may be different from a first lattice shear modulus by 5% or more. In some embodiments, a second lattice shear modulus of a mechanically anisotropic region of three-dimensional mesh 320 may be different from a first lattice shear modulus by 5% to 500%. In some embodiments, a second lattice shear modulus of a mechanically anisotropic region of three-dimensional mesh 320 may be different from a first lattice shear modulus by 10% to 500%.

In some embodiments, a second lattice shear modulus of a mechanically anisotropic region of three-dimensional mesh 320 may be greater than a first lattice shear modulus of the mechanically anisotropic region. In some embodiments, the second lattice shear modulus may be greater than the first lattice shear modulus by 10% or more. In some embodiments, the second lattice shear modulus may be greater than the first lattice shear modulus by 5% or more. In some embodiments, the second lattice shear modulus may be 5% to 500% greater than the first lattice shear modulus. In some embodiments, the second lattice shear modulus may be 10% to 500% greater than the first lattice shear modulus.

In some embodiments, a second lattice shear modulus of a mechanically anisotropic region of three-dimensional mesh 320 may be less than a first lattice shear modulus of the mechanically anisotropic region. In some embodiments, the second lattice shear modulus may be less than the first lattice shear modulus by 10% or more. In some embodiments, the second lattice shear modulus may be less than the first lattice shear modulus by 5% or more. In some embodiments, the second lattice shear modulus may be 5% to 500% less than the first lattice shear modulus. In some embodiments, the second lattice shear modulus may be 10% to 500% less than the first lattice shear modulus.

In some embodiments, a fourth lattice shear modulus of a mechanically anisotropic region of three-dimensional mesh 320 may be different from a third lattice shear modulus by 10% or more. In some embodiments, a fourth lattice shear modulus of a mechanically anisotropic region of three-dimensional mesh 320 may be different from a third lattice shear modulus by 5% or more. In some embodiments, a fourth lattice shear modulus of a mechanically anisotropic region of three-dimensional mesh 320 may be different from a third lattice shear modulus by 5% to 500%. In some embodiments, a fourth lattice shear modulus of a mechanically anisotropic region of three-dimensional mesh 320 may be different from a third lattice shear modulus by 10% to 500%.

In some embodiments, a fourth lattice shear modulus of a mechanically anisotropic region of three-dimensional mesh 320 may be greater than a third lattice shear modulus of the mechanically anisotropic region. In some embodiments, the fourth lattice shear modulus may be greater than the third lattice shear modulus by 10% or more. In some embodiments, the fourth lattice shear modulus may be greater than the third lattice shear modulus by 5% or more. In some embodiments, the fourth lattice shear modulus may be 5% to 500% greater than the third lattice shear modulus. In some embodiments, the fourth lattice shear modulus may be 10% to 500% greater than the third lattice shear modulus.

In some embodiments, a fourth lattice shear modulus of a mechanically anisotropic region of three-dimensional mesh 320 may be less than a third lattice shear modulus of the mechanically anisotropic region. In some embodiments, the fourth lattice shear modulus may be less than the third lattice shear modulus by 10% or more. In some embodiments, the fourth lattice shear modulus may be less than the third lattice shear modulus by 5% or more. In some embodiments, the fourth lattice shear modulus may be 5% to 500% less than the third lattice shear modulus. In some embodiments, the fourth lattice shear modulus may be 10% to 500% less than the third lattice shear modulus.

Other combinations of lattice shear moduli, for example first and third lattice shear moduli, or second and third lattice shear moduli, have any of the same relationships as described above for the first and second lattice shear moduli and the third and fourth lattice shear moduli.

The different lattice shear moduli measured in opposite and/or orthogonal directions provides one or more regions of three-dimensional mesh 320 with anisotropic properties as discussed herein. The orientation of first, second, third, and fourth directions can be selected to provide desired anisotropic properties for three-dimensional mesh 320, and thus midsole 300.

In some embodiments, the first direction may be a longitudinal direction extending between heel end 304 and forefoot end 302 midsole 300. In some embodiments, the first direction may be a forward direction pointing away from heel end 304 of midsole 300. In such embodiments, the forward direction may be the forward direction of longitudinal direction 350 from heel end 304 of midsole 300 to forefoot end 302 of midsole 300.

In some embodiments, the second direction may be a rearward direction pointing toward heel end 304 of midsole 300. In such embodiments, the rearward direction may be the rearward direction of longitudinal direction 350 from forefoot end 302 of midsole 300 to heel end 304 of midsole 300.

In some embodiments, the first direction may be a transverse direction extending between a medial side 306 and a lateral side 308 of midsole 300. In some embodiments, the first direction may be a medial direction pointing away from lateral side 308 of midsole 300. In such embodiments, the medial direction may be the medial direction of transverse direction 352 from lateral side 308 of midsole 300 to medial side 306 of midsole 300.

In some embodiments, the second direction may be a lateral direction pointing toward lateral side 308 of midsole 300. In such embodiments, the lateral direction may be the lateral direction of transverse direction 352 from medial side 306 of midsole 300 to lateral side 308 of midsole 300.

In some embodiments, the third direction may be a longitudinal direction extending between heel end 304 and forefoot end 302 midsole 300. In some embodiments, the third direction may be a forward direction pointing away from heel end 304 of midsole 300. In such embodiments, the forward direction may be the forward direction of longitudinal direction 350 from heel end 304 of midsole 300 to forefoot end 302 of midsole 300.

In some embodiments, the fourth direction may be a rearward direction pointing toward heel end 304 of midsole 300. In such embodiments, the rearward direction may be the rearward direction of longitudinal direction 350 from forefoot end 302 of midsole 300 to heel end 304 of midsole 300.

In some embodiments, the third direction may be a transverse direction extending between a medial side 306 and a lateral side 308 of midsole 300. In some embodiments, the third direction may be a medial direction pointing away from lateral side 308 of midsole 300. In such embodiments, the medial direction may be the medial direction of transverse direction 352 from lateral side 308 of midsole 300 to medial side 306 of midsole 300.

In some embodiments, the fourth direction may be a lateral direction pointing toward lateral side 308 of midsole 300. In such embodiments, the lateral direction may be the lateral direction of transverse direction 352 from medial side 306 of midsole 300 to lateral side 308 of midsole 300.

Figure 3B:
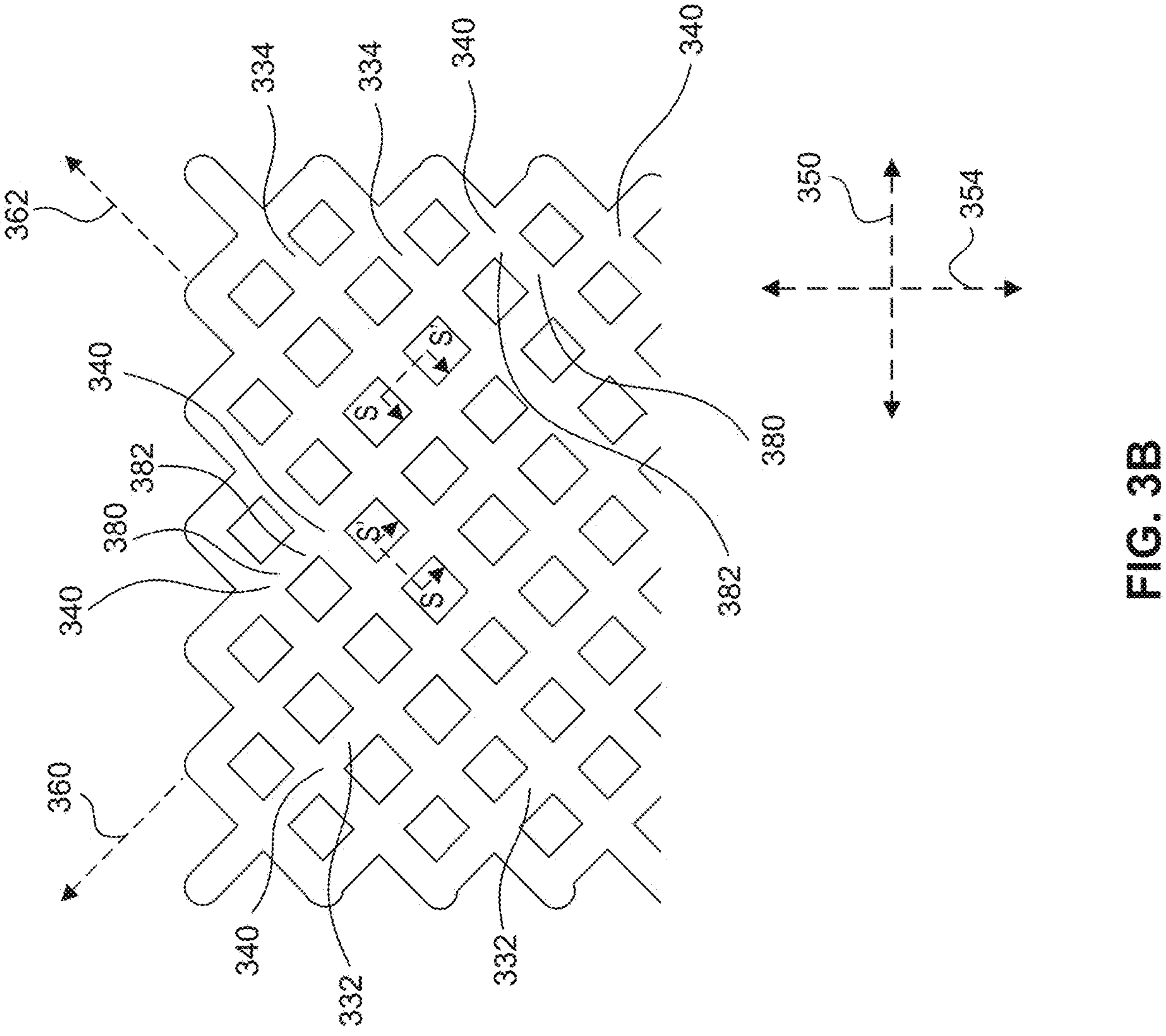
FIG. 3B is an exemplary view of a midsole according to some embodiments along the cross-sectional line B-B' in FIG. 3A.

FIG. 3B shows an exemplary view of three-dimensional mesh 320 along the line B-B' in FIG. 3A. Struts 330 of three-dimensional mesh 320 include a plurality of forwardly-oriented struts 332 and a plurality of rearwardly-oriented struts 334. In FIG. 3B, forwardly-oriented struts 332 are oriented in a forward orientation 360 and rearwardly-oriented struts 334 are oriented in a rearward orientation 362.

The particular orientation of a forwardly-oriented strut 332 is not limited to the forward orientation 360 illustrated in FIG. 3B. Similarly, the particular orientation of a rearwardly-oriented strut 334 is not limited to the rearward orientation 362 illustrated in 3B. "Forwardly-oriented" means that the forward-most point of a strut 330 is above a rearward-most point of the strut 330. For example, as shown in FIG. 3B, a forward-most point 380 of a forwardly-oriented strut 332 is located above a rearward-most point 382 of the forwardly-oriented strut 332. Any strut 330 having its forward-most point located above its rearward-most point is considered "forwardly-oriented." "Rearwardly-oriented" means that the forward-most point of a strut 330 is below a rearward-most point of the strut 330. For example, as shown in FIG. 3B, a forward-most point 380 of a rearwardly-oriented strut 334 is located below a rearward-most point 382 of the rearwardly-oriented strut 334. Any strut 330 having its forward-most point located below its rearward-most point is considered "rearwardly-oriented."

For purposes of determining the relative location of points for a strut 330, a forward-most point is closer to forefoot end 302 of midsole 300 in longitudinal direction 350 and a rearward-most point is closer to heel end 304 of midsole 300 in longitudinal direction 350. Similarly, a point "above" another point is closer to top side 310 of midsole 300 in upward vertical direction 354 and a point "below" another point is closer to a bottom side 312 of midsole 300 in downward vertical direction 354. The forward and rearward-most points of a strut 330 are defined by the points where a strut 330 connects to nodes 340 oat opposite ends of the strut 330.

Figure 3C:
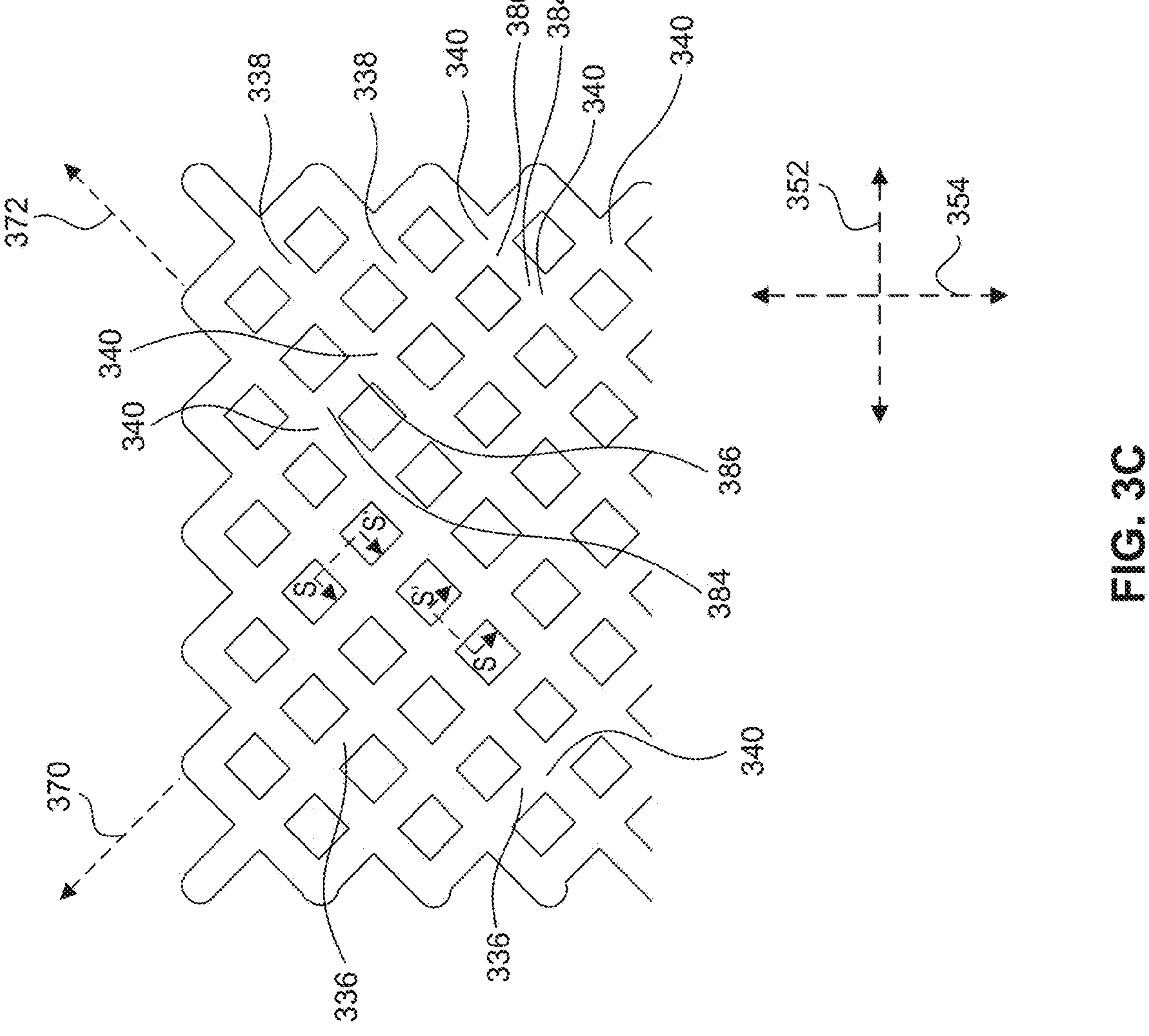
FIG. 3C is an exemplary view of a midsole according to some embodiments along the cross-sectional line C-C' in FIG. 3A.

FIG. 3C shows an exemplary view of three-dimensional mesh 320 along the line C-C' in FIG. 3A. Struts 330 of three-dimensional mesh 320 include a plurality of medially-oriented struts 336 and a plurality of laterally-oriented struts 338. In FIG. 3C, medially-oriented struts 336 are oriented in a medial orientation 370 and laterally-oriented struts 338 are oriented in a lateral orientation 372.

The particular orientation of a medially-oriented strut 336 is not limited to the medial orientation 370 illustrated in FIG. 3C. Similarly, the particular orientation of a laterally-oriented strut 338 is not limited to the lateral orientation 372 illustrated in 3C. "Medially-oriented" means that the medial-most point of a strut 330 is above a lateral-most point of the strut 330. For example, as shown in FIG. 3C, a medial-most point 384 of a medially-oriented strut 336 is located above a lateral-most point 386 of the medially-oriented strut 336. Any strut 330 having its medial-most point located above its lateral-most point is considered "medially-oriented." "Laterally-oriented" means that a medial-most point of a strut 330 is below a lateral-most point of the strut 330. For example, as shown in FIG. 3C, a medial-most point 384 of a laterally-oriented strut 338 is located below a lateral-most point 386 of the laterally-oriented strut 338. Any strut 330 having its medial-most point located below its lateral-most point is considered "laterally-oriented."

For purposes of determining the relative location of points for a strut 330, a medial-most point is closer to medial side 306 of midsole 300 in transverse direction 352 and a lateral-most point is closer to lateral side 308 of midsole 300 in transverse direction 352. The medial and lateral-most points of a strut 330 are defined by the points where a strut 330 connects to nodes 340 oat opposite ends of the strut 330.

A strut may have more than one of a forward orientation, a rearward orientation, a medial orientation, and a lateral orientation. For example, a strut may be forwardly-oriented and medially-oriented. However, a strut cannot be both forwardly-oriented and rearwardly-oriented, and a strut cannot be both medially-oriented and laterally-oriented. For purposes of counting a number of forwardly-oriented, rearwardly-oriented, medially-oriented, and laterally-oriented struts, all orientations of a strut are counted. For example, a strut that is forwardly-oriented and medially-oriented counts a "1" forwardly-oriented strut and "1" medially-oriented strut. In some embodiments, a strut 330 may be only forwardly-oriented, only rearwardly-oriented, only medially-oriented, or only laterally-oriented.

The lattice shear moduli of a mechanically anisotropic three-dimensional mesh 320, or region of mesh 320, may be tailored by designing one or more features of unit cells 322 to provide desired shear moduli. For example, one or a plurality of: (i) the effective diameter of struts 330, (ii) the cross-sectional shape of struts 330, (iii) the number of struts 330 oriented in particular directions, and/or (iv) the shape of unit cells 322 can be designed to provide desired lattice shear moduli.

In some embodiments, lattice shear moduli of a mechanically anisotropic region may be tailored by varying the compressive strength or bend strength of one or more struts 330 defining individual unit cells 322. In some embodiments, the compressive strength and/or bend strength of one or more struts 330 can be influenced by the cross-sectional shape of the struts 330, the effective diameter of the struts 330, or both.

In some embodiments, the effective diameter of different struts 330 defining a particular unit cell 322 may be tailored to provide the particular unit cell 322 with anisotropic properties. In some embodiments, by varying the effective diameter of different struts 330, the mechanical properties of the different struts can be varied. So, by tailoring the effective diameter of struts 330 oriented in different directions, the strength of a particular unit cell 322 in different directions can be controlled, and thus the unit cell 322 can be designed to have desired anisotropic properties. For example, the mechanical properties of a unit cell 322 in a particular direction can be increased or decreased by increasing or decreasing the effective diameter of struts 330 oriented in different directions within the unit cell 322.

By appropriately arranging a plurality of these unit cells 322 having anisotropic properties within a three-dimensional mesh 320, desired lattice shear moduli can be created. For example, a plurality of these unit cells 322 having anisotropic properties can be arranged in the same orientation within mesh 320. As another example, a plurality of these unit cells 322 having anisotropic properties can be arranged in the same orientation in one or more rows in longitudinal direction 350 within mesh 320. As another example, a plurality of these unit cells 322 having anisotropic properties can be arranged in the same orientation in one or more rows in transverse direction 352 within mesh 320.

Figure 13C:
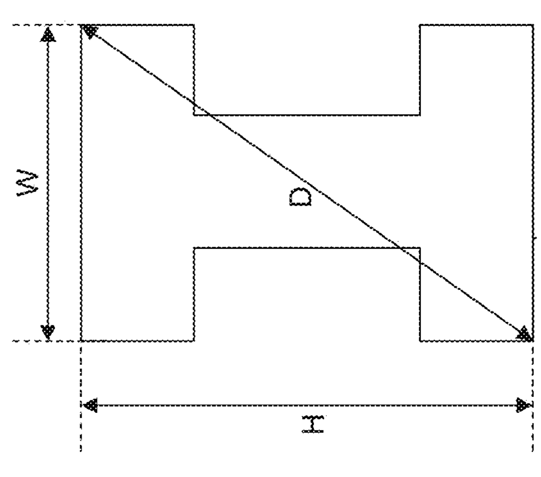
FIG. 13C illustrates a cross-section of a strut along a cross-sectional line S-S' in FIGS. 3B and 3C according to some embodiments.
Figure 13B:
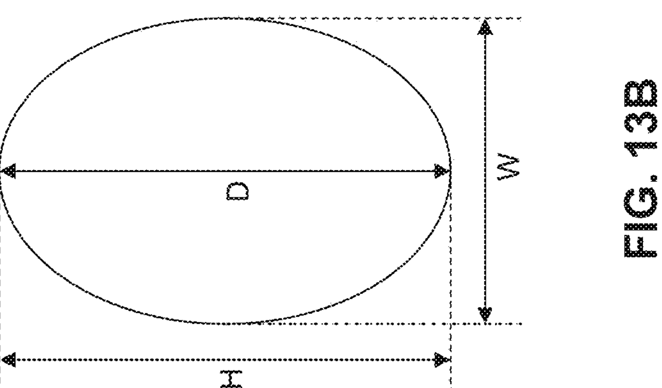
FIG. 13B illustrates a cross-section of a strut along a cross-sectional line S-S' in FIGS. 3B and 3C according to some embodiments.
Figure 13A:
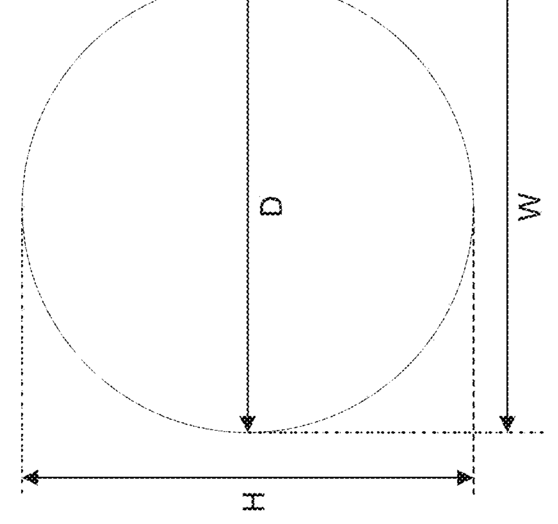
FIG. 13A illustrates a cross-section of a strut along a cross-sectional line S-S' in FIGS. 3B and 3C according to some embodiments.

As used herein, the term "effective diameter" ("D") is utilized to describe the diameter or size of a strut 330, but this term should not be interpreted as requiring a strut 330 to have a circular shape. Instead, struts 330 may have non-circular cross-sectional shapes, and in such embodiments the term "effective diameter" is intended to refer to the maximum cross-sectional dimension of the cross-sectional shape. For example, the "effective diameter" of a strut 330 having a square cross-sectional shape would be the diagonal dimension across the square. As another example, the "effective diameter" of a strut 330 having an oval cross-sectional shape would be the length of the oval-shape's major axis. For a strut 330 having an effective diameter that varies along the length of the strut (e.g., an hourglass shape), the effective diameter is the smallest effective diameter. The cross-sectional shape of a strut 330 is the shape of the strut 330 in a cross-section perpendicular to the length of the strut 330 between two nodes 340 (e.g., a cross-section taken along the line S-S' in FIG. 3B). FIGS. 13A-13C show effective diameters "D" for exemplary cross-sectional shapes. For purposes of comparing the size of a strut 330 having an I-beam cross-sectional shape as described herein, the I-beam cross-sectional shape has an effective diameter "D" as shown in FIG. 13C.

In some embodiments, the cross-sectional shape of different struts 330 defining a particular unit cell 322 may be tailored to provide the particular unit cell 322 with anisotropic properties. In some embodiments, by varying the cross-sectional shape of different struts 330, the mechanical properties of the different struts 330 can be varied. So, by tailoring the cross-sectional shape of struts 330 oriented in different directions, the strength of a particular unit cell 322 in different directions can be controlled, and thus the unit cell 322 can be designed to have desired anisotropic properties. For example, the mechanical properties of a unit cell 322 in a particular direction can be increased or decreased by changing the shape of struts 330 oriented in different directions within the unit cell 322. The cross-sectional shape of a strut 330 is the cross-sectional shape of the strut 330 in a cross-section perpendicular to the length of the strut 330 between two nodes 340 (e.g., a cross-section taken along the lines S-S' in FIGS. 3B and 3C).

By appropriately arranging a plurality of these unit cells 322 having anisotropic properties within a three-dimensional mesh 320, desired lattice shear moduli can be created. For example, a plurality of these unit cells 322 having anisotropic properties can be arranged in the same orientation within mesh 320. As another example, a plurality of these unit cells 322 having anisotropic properties can be arranged in the same orientation in one or more rows in longitudinal direction 350 within mesh 320. As another example, a plurality of these unit cells 322 having anisotropic properties can be arranged in the same orientation in one or more rows in transverse direction 352 of mesh 320.

In some embodiments, the number of struts 330 oriented in different directions within a particular unit cell 322 may be tailored to provide the particular unit cell 322 with anisotropic properties. In some embodiments, by tailoring the number of struts oriented in different directions, the strength of a particular unit cell 322 in different directions can be controlled, and thus the unit cell 322 can be designed to have desired anisotropic properties. For example, the shear modulus of a unit cell 322 in a particular direction can be increased or decreased by changing the number of struts 330 oriented in a different directions within the unit cell 322.

By appropriately arranging a plurality of these unit cells 322 having anisotropic properties within a three-dimensional mesh 320, desired lattice shear moduli can be created. For example, a plurality of these unit cells 322 having anisotropic properties can be arranged in the same orientation within mesh 320. As another example, a plurality of these unit cells 322 having anisotropic properties can be arranged in the same orientation in one or more rows in longitudinal direction 350 within mesh 320. As another example, a plurality of these unit cells 322 having anisotropic properties can be arranged in the same orientation in one or more rows in transverse direction 352 of mesh 320.

In some embodiments, the shape of a particular unit cell 322 may be tailored to provide the particular unit cell 322 with anisotropic properties. By tailoring its shape, the strength of a particular unit cell 322 in different directions can be controlled, and thus the unit cell 322 can be designed to have desired anisotropic properties. For example, the shear modulus of a unit cell 322 in a particular direction can be increased or decreased by changing the shape of the unit cell 322.

By appropriately arranging a plurality of these unit cells 322 having anisotropic properties within a three-dimensional mesh 320, desired lattice shear moduli can be created. For example, a plurality of these unit cells 322 having anisotropic properties can be arranged in the same orientation within mesh 320. As another example, a plurality of these unit cells 322 having anisotropic properties can be arranged in the same orientation in one or more rows in longitudinal direction 350 within mesh 320. As another example, a plurality of these unit cells 322 having anisotropic properties can be arranged in the same orientation in one or more rows in transverse direction 352 within mesh 320.

Figure 4:
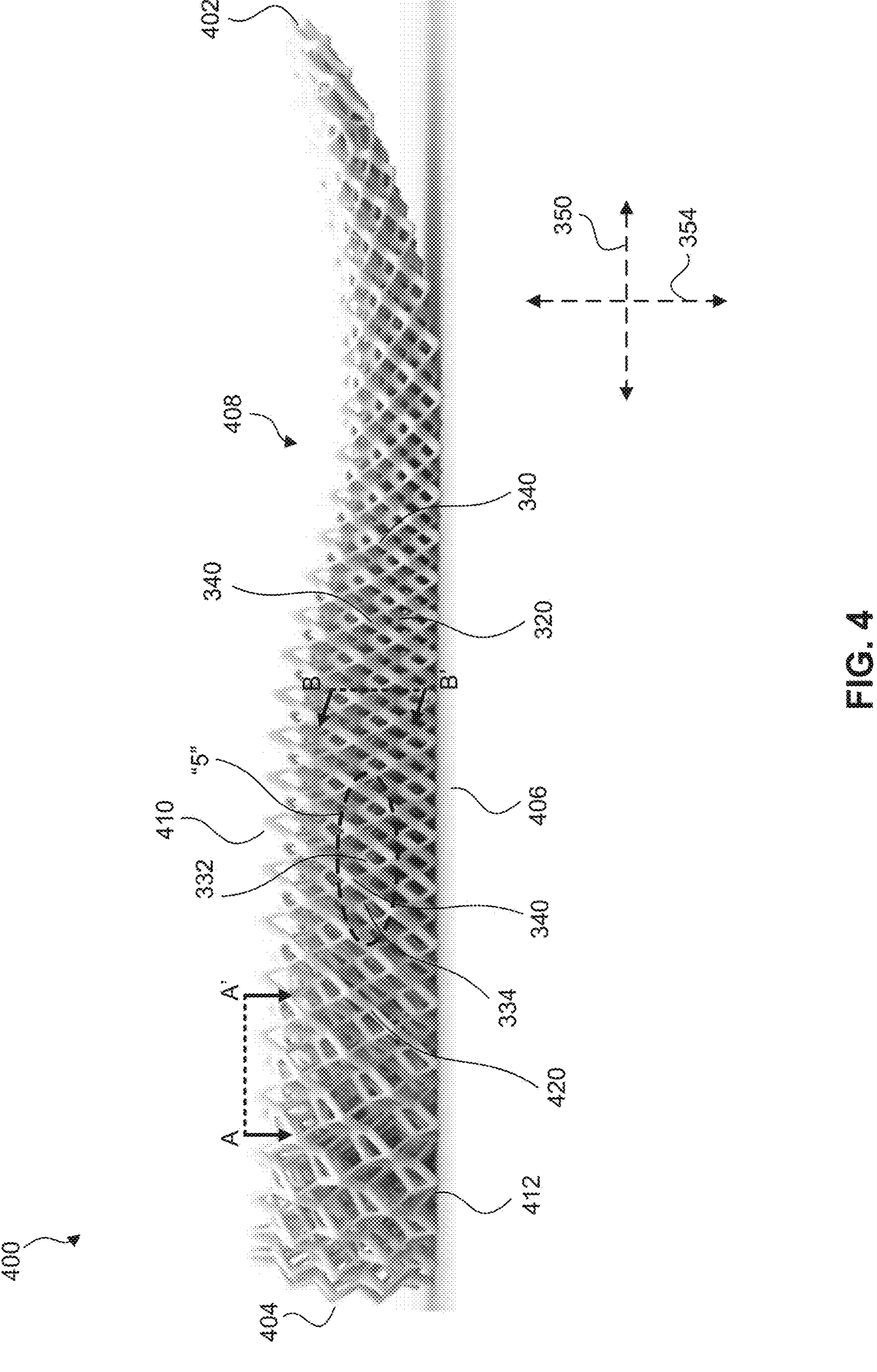
FIG. 4 is a side view of a midsole according to some embodiments.

FIG. 4 illustrates a midsole 400 with a three-dimensional mesh 320 having a mechanically anisotropic region 420 according to some embodiments. Midsole 400 includes a forefoot end 402, a heel end 404, a medial side 406, a lateral side 408, a top side 410, and a bottom side 412. Longitudinal direction 350 of midsole 400 extends between forefoot end 402 and heel end 404. Transverse direction 352 of midsole 400 extends between medial side 406 and lateral side 408 of midsole 400. Vertical direction 354 of midsole 400 extends between top side 410 and bottom side 412 of midsole 400.

Figure 5:
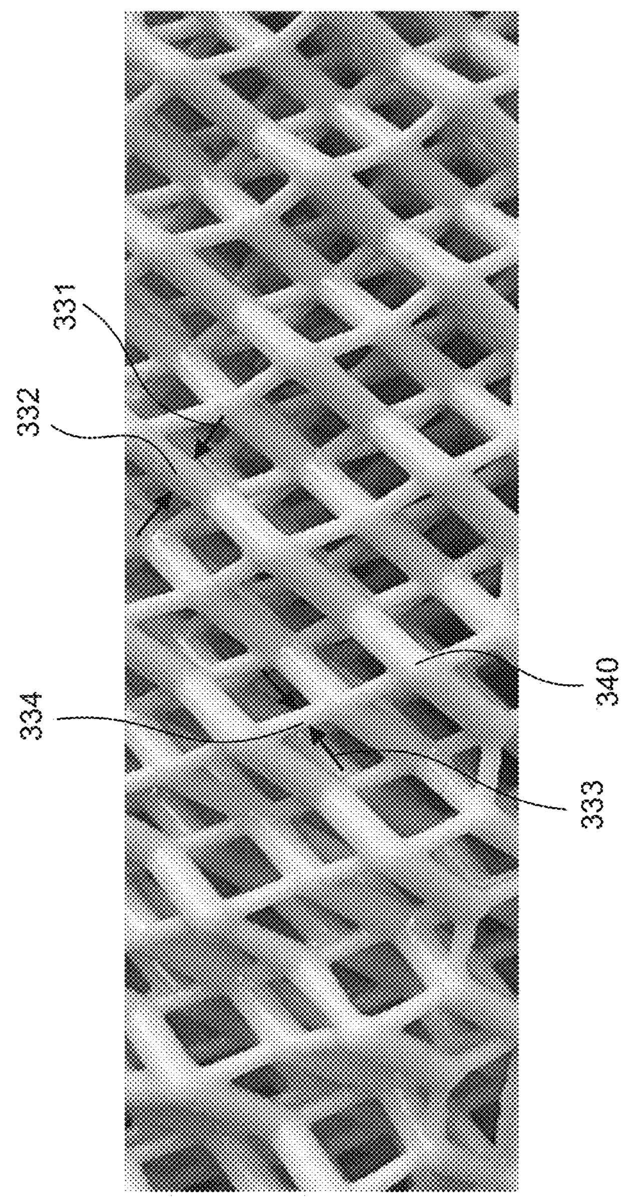
FIG. 5 is a zoomed-in view of a portion of FIG. 4.

Mechanically anisotropic region 420 of midsole 400 includes a plurality of mechanically anisotropic unit cells 322. Each mechanically anisotropic unit cell 322 may include one or more struts 330 having a first effective diameter 331 and one or more struts 330 having a second effective diameter 333 different from first effective diameter 331. FIG. 5 shows a zoomed-in view of a portion of mechanically anisotropic region 420 labeled "5" in FIG. 4.

Figure 6A:
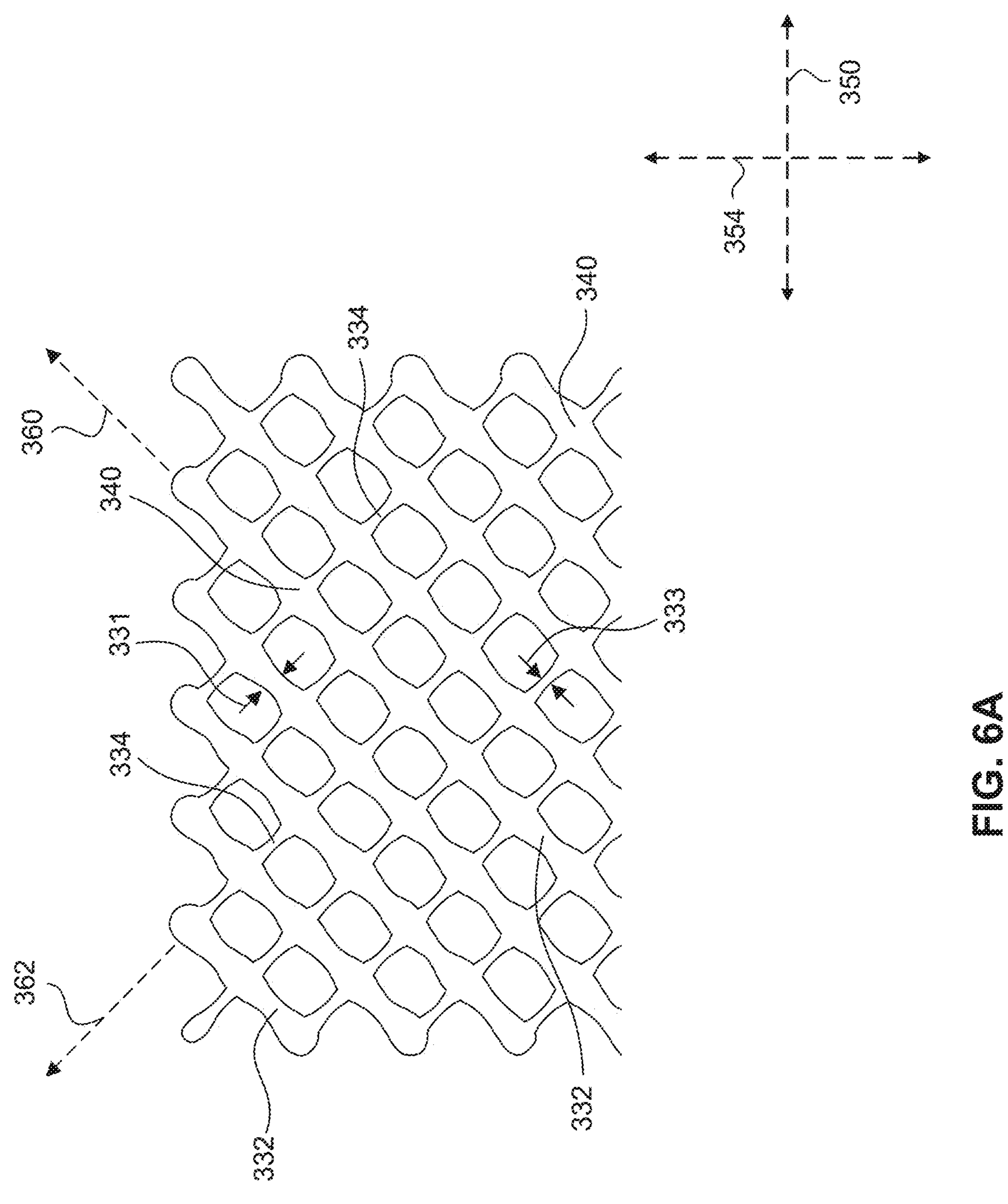
FIG. 6A is an exemplary view of a midsole according to some embodiments along the cross-sectional line A-A' in FIG. 4.

FIG. 6A shows an exemplary view of a midsole 400 according to some embodiments along the cross-sectional line A-A' in FIG. 4. Unit cells 322 of mechanically anisotropic region 420 include a plurality of struts 330 with one or more struts 330 having first effective diameter 331 and one or more struts having second effective diameter 333 different from first effective diameter 331. In the embodiment shown in FIG. 6A, one or more forwardly-oriented struts 332 have first effective diameter 331 and one or more rearwardly-oriented struts 334 have second effective diameter 333. In some embodiments, one forwardly-oriented strut 332 for each of one or more unit cells 322 has first effective diameter 331 and one rearwardly-oriented strut 334 for each of one or more unit cells 322 has second effective diameter 333. In some embodiments, a plurality of forwardly-oriented struts 332 for each of one or more unit cells 322 have first effective diameter 331 and a plurality of rearwardly-oriented struts 334 for each of one or more unit cells 322 have second effective diameter 333.

In some embodiments, first effective diameter 331 may be different from second effective diameter 333 by 10% or more. In some embodiments, first effective diameter 331 may be 10% to 100% different from second effective diameter 333. In some embodiments, first effective diameter 331 may be 40% to 100% different from effective diameter 333.

In some embodiments, first effective diameter 331 may be greater than second effective diameter 333 by 10% or more. In some embodiments, first effective diameter 331 may be 10% to 100% greater than second effective diameter 333. In some embodiments, first effective diameter 331 may be 40% to 100% greater than effective diameter 333.

In some embodiments, first effective diameter 331 may be less than second effective diameter 333 by 10% or more. In some embodiments, first effective diameter 331 may be 10% to 100% less than second effective diameter 333. In some embodiments, first effective diameter 331 may be 40% to 100% less than effective diameter 333.

In some embodiments, the difference between first effective diameter 331 and second effective diameter 333 can be characterized by a "beam bias ratio," which is the ratio of first effective diameter 331 to second effective diameter 333. For example, a beam bias ratio of 2 means first effective diameter 331 is twice as the size of second effective diameter 333. As another example, a beam ratio of 1.4 means first effective diameter 331 is 1.4 times larger than the size of second effective diameter 333. In some embodiments, the beam bias ratio may range from 0.5 to 2, including subranges. For example, the beam basis ratio may be 0.5 to 2, 0.5 to 1, 0.5 to 0.75, 1 to 2, or 1 to 1.5.

In some embodiments, first effective diameter 331 may be in a range of 0.5 millimeters (mm) to 8 millimeters (mm). In some embodiments, second effective diameter 333 may be in a range of 0.5 mm to 8 mm.

In embodiments where first effective diameter 331 is greater than second effective diameter 333, mechanically anisotropic region 420 may have a lattice shear modulus measured in a forward longitudinal direction 350 that is less than a lattice shear modulus measured in a rearward longitudinal direction 350. In this case, the difference in lattice shear moduli can be a result of the rearwardly-oriented struts 334 having a smaller effective diameter compared to the forwardly-oriented struts 332.

In embodiments where first effective diameter 331 is less than second effective diameter 333, mechanically anisotropic region 420 may have a lattice shear modulus measured in a forward longitudinal direction 350 that is greater than a lattice shear modulus measured in a rearward longitudinal direction 350. In this case, the difference in lattice shear moduli can be a result of the rearwardly-oriented struts 334 having a larger effective diameter compared to the forwardly-oriented struts 332.

Figure 6B:
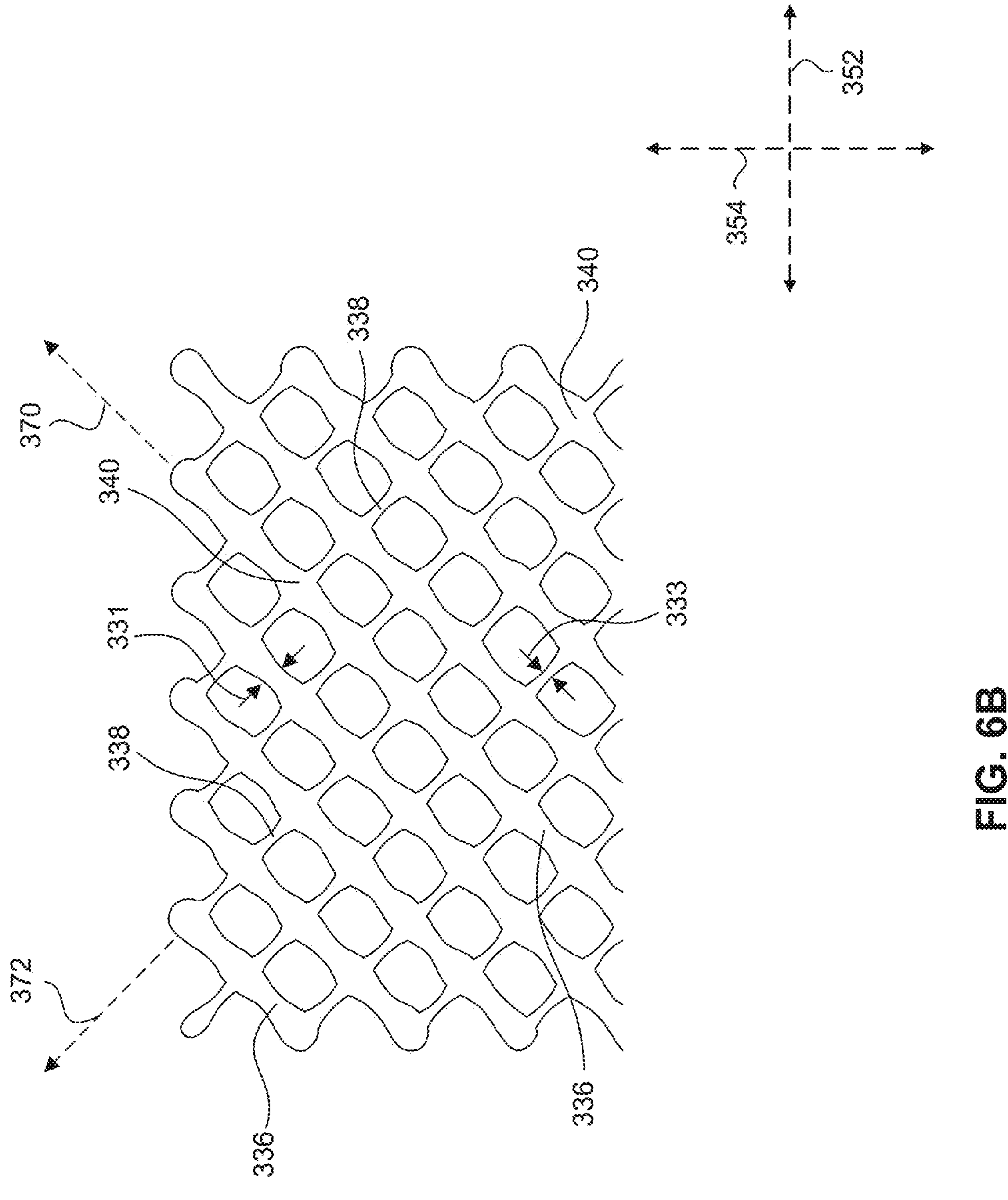
FIG. 6B is an exemplary view of a midsole according to some embodiments along the cross-sectional line B-B' in FIG. 4.

FIG. 6B shows an exemplary view of a midsole 400 according to some embodiments along the cross-sectional line B-B' in FIG. 4. In the embodiment shown in FIG. 6B, one or more medially-oriented struts 336 have first effective diameter 331 and one or more laterally-oriented struts 338 have second effective diameter 333. In some embodiments, one medially-oriented strut 336 for each of one or more unit cells 322 has first effective diameter 331 and one laterally-oriented strut 338 for each of one or more unit cells 322 has second effective diameter 333. In some embodiments, a plurality of medially-oriented struts 336 for each of one or more unit cells 322 have first effective diameter 331 and a plurality of laterally-oriented struts 338 for each of one or more unit cells 322 have second effective diameter 333.

In embodiments where first effective diameter 331 is greater than second effective diameter 333, mechanically anisotropic region 420 may have a lattice shear modulus measured in a medial transverse direction 352 that is less than a lattice shear modulus measured in a lateral transverse direction 352. In this case, the difference in lattice shear moduli can be a result of the laterally-oriented struts 338 having a smaller effective diameter compared to the medially-oriented struts 336.

In embodiments where first effective diameter 331 is less than second effective diameter 333, mechanically anisotropic region 420 may have a lattice shear modulus measured in a medial transverse direction 352 that is greater than a lattice shear modulus measured in a lateral transverse direction 352. In this case, the difference in lattice shear moduli can be a result of the laterally-oriented struts 338 having a larger effective diameter compared to the medially-oriented struts 336.

Figure 7A:
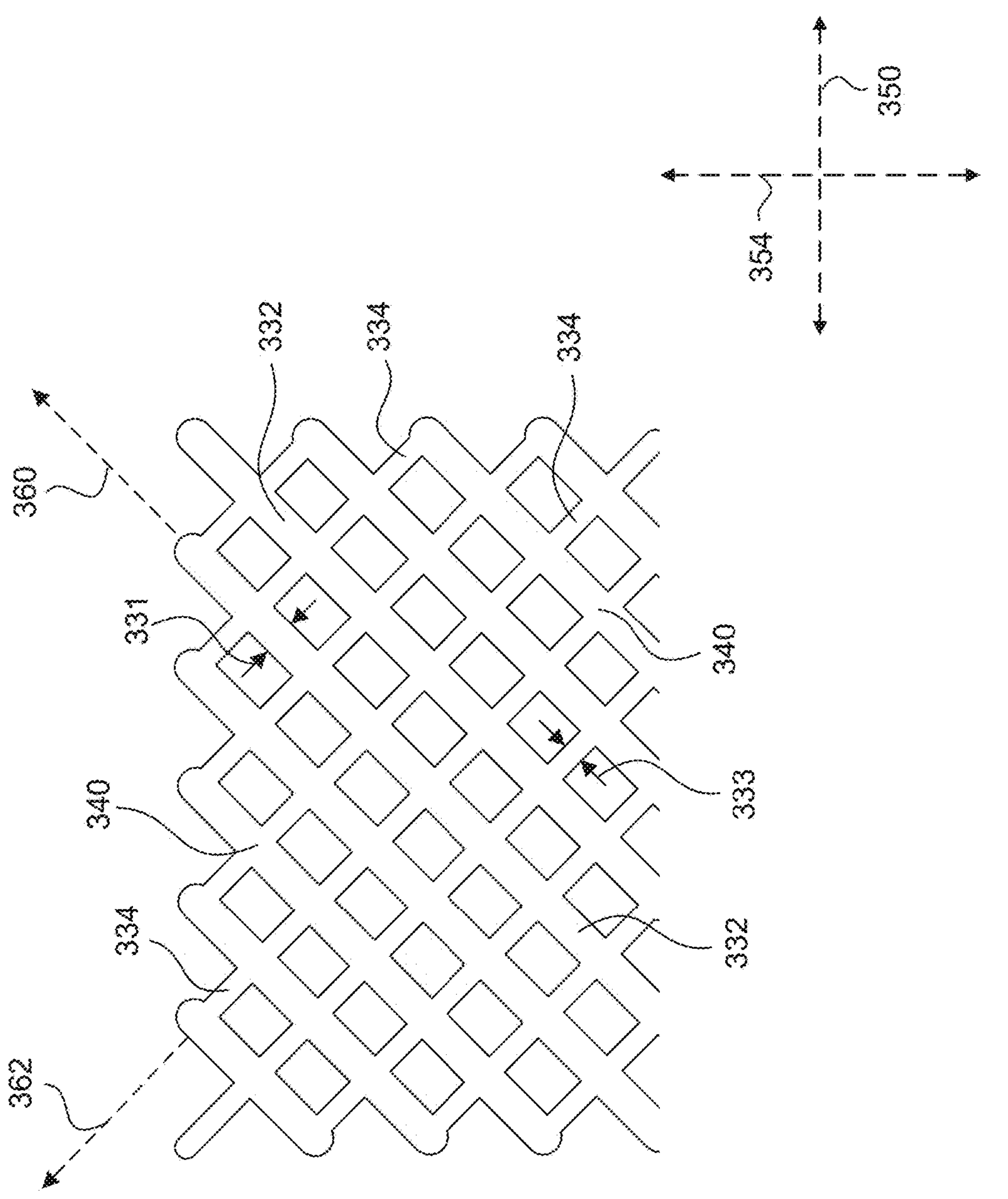
FIG. 7A is an exemplary view of a midsole according to some embodiments along the cross-sectional line A-A' in FIG. 4.
Figure 7B:
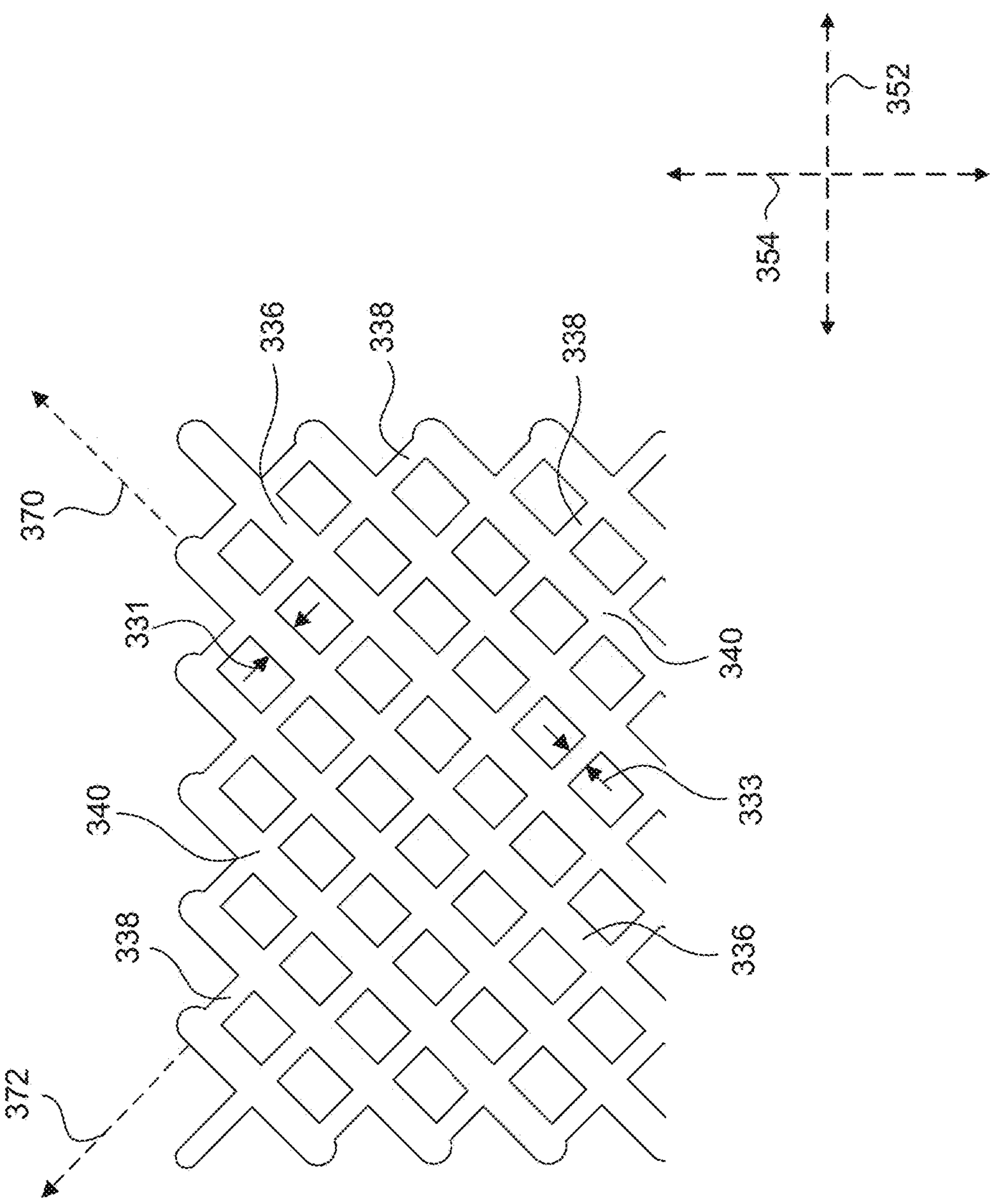
FIG. 7B is an exemplary view of a midsole according to some embodiments along the cross-sectional line B-B' in FIG. 4.

FIGS. 6A and 6B illustrate struts 330 having a cross-sectional shape that changes along the length of struts 330 between two nodes 340. In some embodiments, the cross-sectional shape may change according to a Bezier function with the diameter of struts 330 being thinnest between two nodes (e.g., an hourglass shape). Designing the cross-sectional shape of struts in this fashion can reduce the weight of a three-dimensional mesh. Additionally, designing the cross-sectional shape of struts in this fashion can create a more uniform distribution of stress across a unit cell, or group of unit cells. However, in some embodiments, the cross-sectional shape of struts 330 may be constant along the length of struts 330 between two nodes 340, for example, as illustrated in FIGS. 7A and 7B. The orientations and effective diameters of struts 330 illustrated in FIGS. 7A and 7B may be the same as those discussed above for the struts illustrated in FIGS. 6A and 6B.

In some embodiments, first effective diameter 331 and/or second effective diameter 333 may remain constant along longitudinal direction 350 of midsole 400. In some embodiments, first effective diameter 331 and/or second effective diameter 333 may change along longitudinal direction 350 of midsole 400. In some embodiments, first effective diameter 331 and/or second effective diameter 333 may increase in a forward direction between heel end 404 and forefoot end 402 of midsole 400. In some embodiments, first effective diameter 331 and/or second effective diameter 333 may increase in a rearward direction from forefoot end 402 end to heel end 404 of midsole 400. In some embodiments, first effective diameter 331 and/or second effective diameter 333 may increase at a rate of about 0.025 mm per 1 mm along longitudinal direction 350. As a non-limiting example, first effective diameter 331 may change from 5 mm to 5.5 mm over a 20 mm section of heel portion of midsole 400. By increasing first effective diameter 331 and/or second effective diameter 333 in the forward or rearward direction, the mechanical properties, such as stiffness and lattice shear moduli, of midsole 400 can be can be varied along longitudinal direction 350.

In some embodiments, first effective diameter 331 and/or second effective diameter 333 may remain constant along transverse direction 352 of midsole 400. In some embodiments, first effective diameter 331 and/or second effective diameter 333 may change along transverse direction 352 of midsole 400. In some embodiments, first effective diameter 331 and/or second effective diameter 333 may increase in a medial direction from lateral side 408 to medial side 406 of midsole 400. In some embodiments, first effective diameter 331 and/or second effective diameter 333 may increase in a lateral direction from medial side 406 to lateral side 408 of midsole 400. In some embodiments, first effective diameter 331 and/or second effective diameter 333 may increase at a rate of about 0.025 mm per 1 mm along transverse direction 352. By increasing first effective diameter 331 and/or second effective diameter 333 in the medial or lateral direction, the mechanical properties, such as stiffness and lattice shear moduli, of midsole 400 can be can be varied along transverse direction 352.

Figure 8:
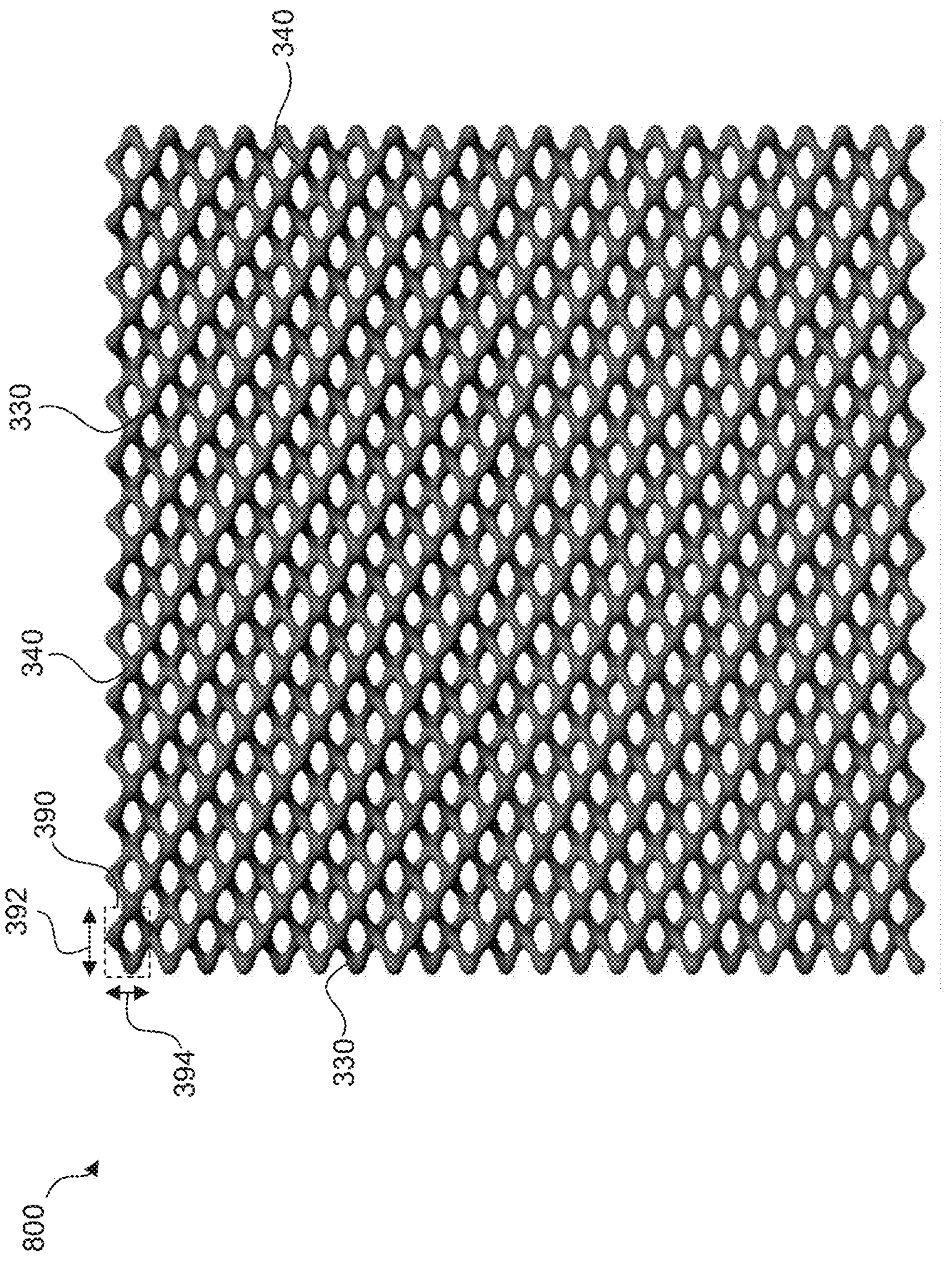
FIG. 8 illustrates a mechanically anisotropic mesh according to some embodiments.

FIG. 8 illustrates a three-dimensional mesh 320 with a mechanically anisotropic mesh 800 according to some embodiments. In some embodiments, mechanically anisotropic mesh 800 may define an anisotropic region of a midsole, for example an anisotropic region of midsole 300. Mechanically anisotropic mesh 800 includes a plurality of interconnected unit cells each occupying a rectangular-cuboid volume 390. The rectangular-cuboid volume 390 has a length 392 and a width 394. In embodiments including a mechanically anisotropic mesh 800, the orientation of length 392 and width 394 may provide mesh 800 with anisotropic properties.

In some embodiments, rectangular-cuboid volume 390 may have a length 392 that is greater than width 394. In some embodiments, length 392 and width 394 can be in a range of 5 mm to 20 mm. In some embodiments, rectangular-cuboid volume 390 may have a length to width ratio in a range of 1.1 to 2.5, including subranges. For example, rectangular-cuboid volume 390 may have a length to width ratio in a range of 1.1 to 2.5, 1.1 to 2, 1.1 to 1.5, 1.5 to 2.5, or 2 to 2.5.

In some embodiments, rectangular-cuboid volume 390 may have a length 392 that is less than width 394. In some embodiments, rectangular-cuboid volume 390 may have a width to length ratio in a range of 1.1 to 2.5, including subranges. For example, rectangular-cuboid volume 390 may have a length to width ratio in a range of 1.1 to 2.5, 1.1 to 2, 1.1 to 1.5, 1.5 to 2.5, or 2 to 2.5.

In embodiments where length 392 is greater than width 394, mechanically anisotropic mesh 800 may have a lattice shear modulus measured in the direction of length 392 that is greater than a lattice shear modulus measured in the direction of width 394. In embodiments where length 392 is less than width 394, mechanically anisotropic mesh 800 may have a lattice shear modulus measured in the direction of length 392 that is less than a lattice shear modulus measured in the direction of width 394.

In some embodiments, the direction of length 392 in a three-dimensional mesh 320 may be along longitudinal direction 350 of a sole including a three-dimensional mesh 320 with mechanically anisotropic mesh 800. In some embodiments, the direction of width 394 in a three-dimensional mesh 320 may be along longitudinal direction 350 of a sole including a three-dimensional mesh 320 with mechanically anisotropic mesh 800. In some embodiments, the direction of length 392 in a three-dimensional mesh 320 may be along transverse direction 352 of a sole including a three-dimensional mesh 320 with mechanically anisotropic mesh 800. In some embodiments, the direction of width 394 in a three-dimensional mesh 320 may be along transverse direction 352 of a sole including a three-dimensional mesh 320 with mechanically anisotropic mesh 800.

In some embodiments, unit cell(s) 322 of a three-dimensional mesh 320 may include a different number of struts oriented in one or more particular directions. By arranging unit cells 322 with a different number of struts oriented in one or more particular directions appropriately within a three-dimensional mesh 320, all or a portion of three-dimensional mesh 320 may have anisotropic lattice shear moduli as discussed herein.

Figure 9:
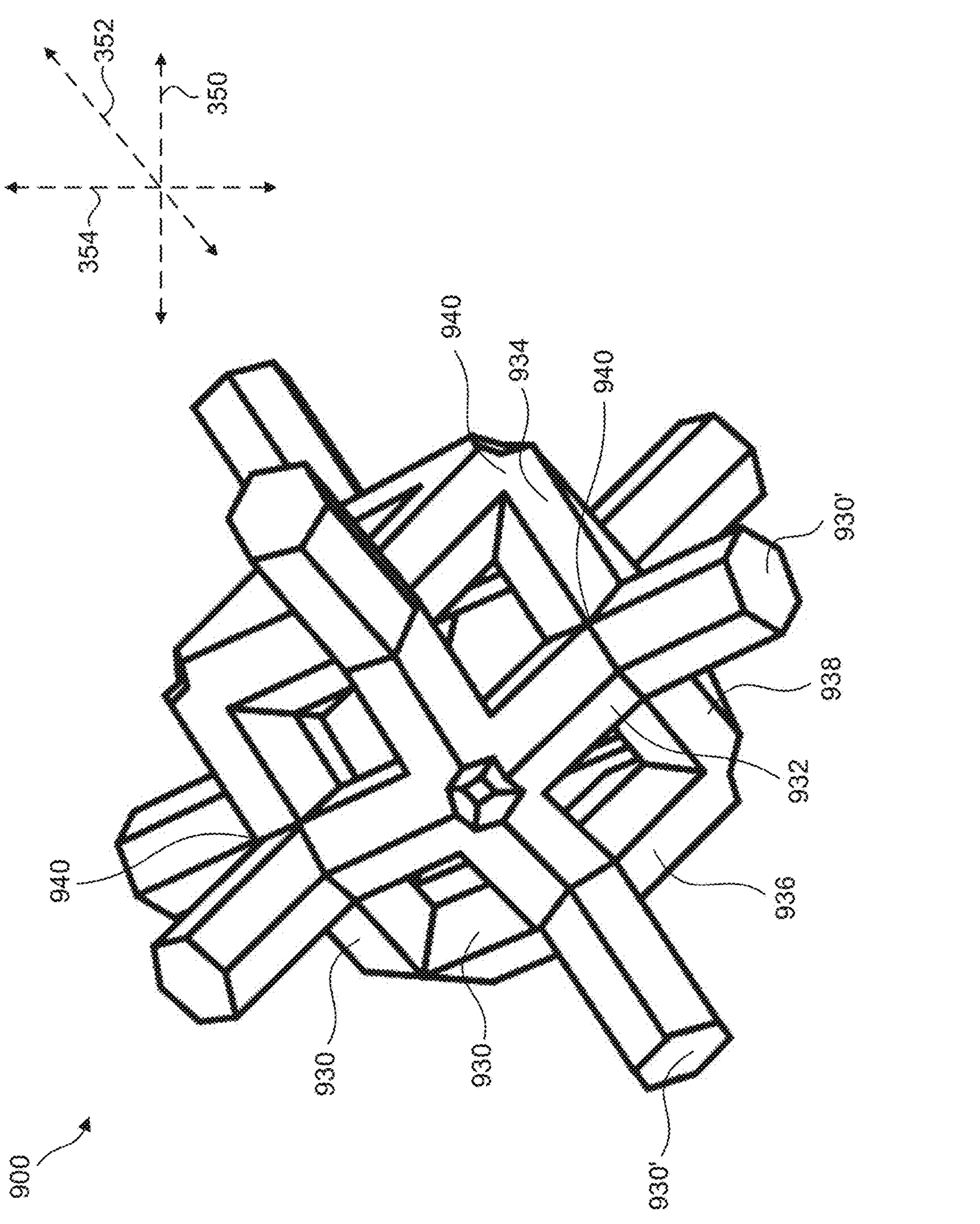
FIG. 9 illustrates a unit cell according to some embodiments.

FIG. 9 illustrates an exemplary unit cell 900 for a three-dimensional mesh 320 according to some embodiments. For purposes of explanation, exemplary unit cell 900 is oriented within a three-dimensional mesh 320 such that the longitudinal direction 350, transverse direction 352, and vertical direction 354 are oriented as shown in FIG. 9.

Similar to unit cells 322 described herein, unit cell 900 includes a plurality of struts 930 defining a three-dimensional shape of unit cell 900. Also, struts 930 are connected at nodes 940. Unit cell 900 may include one or more forwardly-oriented struts (for example, strut 932). Unit cell 900 may include one or more rearwardly-oriented struts (for example, strut 934). Unit cell 900 may include one or more medially-oriented struts (for example, strut 936). Unit cell 900 may include one or more laterally-oriented struts (for example, strut 938). As discussed herein, a plurality of unit cells 900 may be used to build a three-dimensional mesh 320. For example, struts 930' from adjacent unit cells 900 in a three-dimensional mesh 320 are shown in FIG. 9 as connected to nodes 940 of unit cell 900.

In some embodiments, unit cell 900 may include a number of forwardly-oriented struts that is different from a number of forwardly-oriented struts. In some embodiments, the number of forwardly-oriented struts may be greater than the number of rearwardly-oriented struts. As a non-limiting example, in some embodiments, unit cell 900 may be modified to include a larger number of forwardly-oriented struts by removing the rearwardly-oriented strut labeled "934" in FIG. 9. In some embodiments, the number of forwardly-oriented struts may be greater than the number of rearwardly-oriented struts by one or more, two or more, or three or more. In some embodiments, the number of forwardly-oriented struts may be less than the number of rearwardly-oriented struts. As a non-limiting example, in some embodiments, unit cell 900 may be modified to include a smaller number of forwardly-oriented struts by removing the forwardly-oriented strut labeled "932" in FIG. 9. In some embodiments, the number of forwardly-oriented struts may be less than the number of rearwardly-oriented struts by one or more, two or more, or three or more.

In embodiments with a larger number of forwardly-oriented struts, unit cell 900 may have a shear modulus measured in a forward longitudinal direction 350 that is less than a shear modulus measured in a rearward longitudinal direction 350. Since the rearwardly-oriented struts have a greater influence on the shear modulus measured in the forward direction for unit cell 900, the smaller number of these struts can create a shear modulus that is smaller in the forward direction. Also, since unit cells 900 according to such embodiments have a smaller shear modulus measured in a forward direction, such unit cells can be used to create a three-dimensional mesh 320, or a region of three-dimensional mesh 320, having a relatively smaller lattice shear modulus measured in the forward direction.

In embodiments with a smaller number of forwardly-oriented struts, unit cell 900 may have a shear modulus measured in a forward longitudinal direction 350 that is greater than a lattice shear modulus measured in a rearward longitudinal direction 350. Since the forwardly-oriented struts have a greater influence on the shear modulus measured in the rearward direction for unit cell 900, the smaller number of these struts can create a shear modulus that is smaller in the rearward direction. Also, since unit cells 900 according to such embodiments have a smaller shear modulus measured in a rearward direction, such unit cells can be used to create a three-dimensional mesh 320, or a region of three-dimensional mesh 320, having a relatively smaller lattice shear modulus measured in the rearward direction.

In some embodiments, unit cell 900 may include a number of medially-oriented struts that is different from a number of laterally-oriented struts. In some embodiments, the number of medially-oriented struts may be greater than the number of laterally-oriented struts. As a non-limiting example, in some embodiments, unit cell 900 may be modified to include a larger number of medially-oriented struts by removing the laterally-oriented strut labeled "938" in FIG. 9. In some embodiments, the number of medially-oriented struts may be greater than the number of laterally-oriented struts by one or more, two or more, or three or more. In some embodiments, the number of medially-oriented struts may be less than the number of laterally-oriented struts. As a non-limiting example, in some embodiments, unit cell 900 may be modified to include a smaller number of medially-oriented struts by removing the medially-oriented strut labeled "936" in FIG. 9. In some embodiments, the number of medially-oriented struts may be less than the number of laterally-oriented struts by one or more, two or more, or three or more.

In embodiments with a larger number of medially-oriented struts, unit cell 900 may have a shear modulus measured in a medial transverse direction 352 that is less than a lattice shear modulus measured in a lateral transverse direction 352. Since the laterally-oriented struts have a greater influence on the shear modulus measured in the medial direction for unit cell 900, the smaller number of these struts can create a shear modulus that is smaller in the medial direction. Also, since unit cells 900 according to such embodiments have a smaller shear modulus measured in a medial direction, such unit cells can be used to create a three-dimensional mesh 320, or a region of three-dimensional mesh 320, having a relatively smaller lattice shear modulus measured in the medial direction.

In embodiments with a smaller number of medially-oriented struts, unit cell 900 may have a shear modulus measured in a medial transverse direction 352 that is greater than a lattice shear modulus measured in a lateral transverse direction 352. Since the medially-oriented struts have a greater influence on the shear modulus measured in the lateral direction for unit cell 900, the smaller number of these struts can create a shear modulus that is smaller in the lateral direction. Also, since unit cells 900 according to such embodiments have a smaller shear modulus measured in a lateral direction, such unit cells can be used to create a three-dimensional mesh 320, or a region of three-dimensional mesh 320, having a relatively smaller lattice shear modulus measured in the lateral direction.

In some embodiments, unit cell 900 may include a total number of forwardly-oriented struts plus rearwardly-oriented struts that is different from a total number of medially-oriented struts plus laterally-oriented struts. In some embodiments, the total number of forwardly-oriented struts plus rearwardly-oriented struts may be greater than the total number of medially-oriented struts plus laterally-oriented struts. In some embodiments, the total number of forwardly-oriented struts plus rearwardly-oriented struts may be greater than the total number of medially-oriented struts plus laterally-oriented struts by one or more, two or more, or three or more. In some embodiments, the total number of forwardly-oriented struts plus rearwardly-oriented struts may be less than the total number of medially-oriented struts plus laterally-oriented struts. In some embodiments, the total number of forwardly-oriented struts plus rearwardly-oriented struts may be less than the total number of medially-oriented struts plus laterally-oriented struts by one or more, two or more, or three or more.

In embodiments with a larger total number of forwardly-oriented and rearwardly-oriented struts, unit cell 900 may have shear moduli measured in forward and rearward longitudinal direction 350 that are greater than a lattice shear modulus measured in medial and/or lateral transverse direction 352. Since the forwardly-oriented and rearwardly-oriented struts can have a larger influence on the shear moduli in the forward and rearward longitudinal direction for unit cell 900, the larger number of these struts can create larger shear moduli in these directions. Also, since unit cells 900 according to such embodiments have larger shear moduli measured in these directions, such unit cells can be used to create a three-dimensional mesh 320, or a region of three-dimensional mesh 320, having relatively larger lattice shear moduli measured in forward and rearward longitudinal direction 350.

In embodiments with a larger total number of medially-oriented and laterally-oriented struts, unit cell 900 may have shear moduli measured in medial and lateral transverse direction 352 that are greater than a lattice shear modulus measured in forward and/or rearward longitudinal direction 350. Since the medially-oriented and laterally-oriented struts can have a larger influence the shear moduli in the medial and lateral transverse direction for unit cell 900, the larger number of these struts can create relatively larger shear moduli in these directions. Also, since unit cells 900 according to such embodiments have larger shear moduli measured in these directions, such unit cells can be used to create a three-dimensional mesh 320, or a region of three-dimensional mesh 320, having larger lattice shear moduli measured in medial and lateral transverse direction 352.

In some embodiments, unit cell 900 may include one or more struts 930 having a first cross-sectional shape and one or more struts 930 having a second cross-sectional shape different from the first cross-sectional shape. Suitable cross-sectional shapes for struts 930 include, but are not limited to a triangular shape, a square shape, a hexagonal shape, a circular shape, an oval shape, or an I-beam shape. In some embodiments, struts 930 may be solid bar-like or tube-like elements. In some embodiments, struts 930 may be hollow bar-like or tube-like elements. FIGS. 13A-13C show exemplary cross-sectional shapes for struts according to some embodiments.

In some embodiments, unit cell 900 may include one or more forwardly-oriented struts (for example, strut 932) having a first cross-sectional shape and one or more a rearwardly-oriented struts (for example, strut 934) having a second cross-sectional shape different from the first cross-sectional shape. In some embodiments, each forwardly-oriented strut of unit cell 900 may have a first cross-sectional shape and each rearwardly-oriented strut of unit cell 900 may have a second cross-sectional shape different from the first cross-sectional shape.

In some embodiments, unit cell 900 may include one or more medially-oriented struts (for example, strut 936) having a first cross-sectional shape and one or more laterally-oriented struts (for example, strut 938) having a second cross-sectional shape different from the first cross-sectional shape. In some embodiments, each medially-oriented strut of unit cell 900 may have a first cross-sectional shape and each laterally-oriented strut of unit cell 900 may have a second cross-sectional shape different from the first cross-sectional shape.

In some embodiments, the first cross-sectional shape and the second cross-sectional shape may be different shapes. For example, the first cross-sectional shape may be a circular shape and the second cross-sectional shape may be an oval shape.

In some embodiments, the first cross-sectional shape and the second cross-sectional shape may be the same shape oriented in different directions. For example, the first cross-sectional shape may be an oval shape with its height dimension (H) pointing towards top side 310 and bottom side 312 of a three-dimensional mesh 320 and the second cross-sectional shape may be an oval shape with its height dimension (H) pointing towards a medial side 306 and lateral side 308 of the three-dimensional mesh 320.

The use of different cross-sectional shapes having different mechanical properties (for example, compressive strength or shear strength) for different struts of unit cell 900 can provide unit cell 900 with mechanically anisotropic properties as discussed herein.

For example, in embodiments with one or more forwardly-oriented struts having a cross-sectional shape that is stronger in a particular direction than the cross-sectional shape of one or more rearwardly-oriented struts, unit cell 900 may have a shear modulus measured in a forward longitudinal direction 350 that is less than a shear modulus measured in a rearward longitudinal direction 350. Since the rearwardly-oriented struts have a greater influence on the shear modulus measured in the forward direction for unit cell 900, the relative weakness of the rearwardly-oriented struts can create a shear modulus that is smaller in the forward direction. Also, since unit cells 900 according to such embodiments have a smaller shear modulus measured in a forward direction, such unit cells can be used to create a three-dimensional mesh 320, or a region of three-dimensional mesh 320, having a relatively smaller lattice shear modulus measured in the forward direction. The opposite result can be created by designing unit cell 900 with one or more forwardly-oriented struts having a cross-sectional shape that is weaker in a particular direction than the cross-sectional shape of one or more rearwardly-oriented struts.

As another example, in embodiments with one or more medially-oriented struts having a cross-sectional shape stronger in a particular direction compared to the cross-sectional shape of one or more laterally-oriented struts, unit cell 900 may have a shear modulus measured in a medial transverse direction 352 that is less than a shear modulus measured in a lateral transverse direction 352. Since the laterally-oriented struts have a greater influence on the shear modulus measured in the medial direction for unit cell 900, the relative weakness of the laterally-oriented struts can create a shear modulus that is smaller in the medial direction. Also, since unit cells 900 according to such embodiments have a relatively smaller shear modulus measured in a medial direction, such unit cells can be used to create a three-dimensional mesh 320, or a region of three-dimensional mesh 320, having a smaller lattice shear modulus measured in the medial direction. The opposite result can be created by designing unit cell 900 with one or more medially-oriented struts having a cross-sectional shape that is weaker in a particular direction compared to the cross-sectional shape of one or more laterally-oriented struts.

A three-dimensional mesh 320 as described herein may be made using a three-dimensional (3-D) printing process. In such embodiments, 3-D printing three-dimensional mesh 320 for a sole includes printing a plurality of interconnected unit cells 322, with each interconnected unit cell 322 including a plurality of struts 330 defining a three-dimensional shape and a plurality of nodes 340 at which one or more struts 330 are connected. In such embodiments, the 3-D printing process includes printing a set of interconnected unit cells 322 that define one or more mechanically anisotropic regions for the three-dimensional mesh 320. The mechanically anisotropic region(s) for the three-dimensional mesh 320 may include anisotropic lattice shear moduli as discussed herein.

In some embodiments, 3-D printing a set of interconnected unit cells 322 may include printing struts 330 having first effective diameter 331 and printing struts 330 having second effective diameter 333 different from first effective diameter 331 as discussed herein. For example, in some embodiments, the 3-D printing process may include 3-D printing struts 330 oriented in a first direction and having first effective diameter 331 and 3-D printing struts 330 oriented in a second direction different from the first direction and having second effective diameter 333. For example, in some embodiments, the first direction may be forwardly-oriented and the second direction may rearwardly-oriented. As other example, in some embodiments, the first direction may be medially-oriented and the second direction may be laterally-oriented.

In some embodiments, 3-D printing a set of interconnected unit cells 322 may include printing individual unit cells 322 each occupying a rectangular-cuboid volume. In such embodiments, the rectangular-cuboid volume may have the length and width ratios as discussed herein for length 392 and width 394.

In some embodiments, 3-D printing a set of interconnected unit cells 322 may include printing a plurality of unit cells 322 with each unit cell 322 having a number struts 330 oriented in a first direction that is different from a number of struts 330 oriented in a second direction that is different from the first direction. For example, in some embodiments, the first direction may be forwardly-oriented and the second direction may rearwardly-oriented. As another example, in some embodiments, the first direction may be medially-oriented and the second direction may be laterally-oriented.

For example, 3-D printing a set of interconnected unit cells 322 may include printing a plurality of unit cells 322 with each unit cell 322 having a number of forwardly-oriented struts 332 and a number of rearwardly-oriented struts 334 different from the number of forwardly-oriented struts 332. As another example, 3-D printing a set of interconnected unit cells 322 may include printing a plurality of unit cells 322 with each unit cell 322 having a number of medially-oriented struts 336 and a number of laterally-oriented struts 338 different from the number of medially-oriented struts 336.

In some embodiments, 3-D printing a set of interconnected unit cells 322 may include printing struts 330 having a first cross-sectional shape and printing struts 330 having a second cross-sectional shape different from the first cross-sectional shape. For example, in some embodiments, the 3-D printing process may include 3-D printing struts 330 oriented in a first direction and having a first cross-sectional shape and 3-D printing struts 330 oriented in a second direction different from the first direction and having a second cross-sectional shape different from the first cross-sectional shape. For example, in some embodiments, the first direction may be forwardly-oriented and the second direction may rearwardly-oriented. As other example, in some embodiments, the first direction may be medially-oriented and the second direction may be laterally-oriented.

In some embodiments, making a three-dimensional mesh 320 may include collecting biometric data and printing one or more mechanically anisotropic regions of three-dimensional mesh 320 based on the biometric data.

Figure 10:
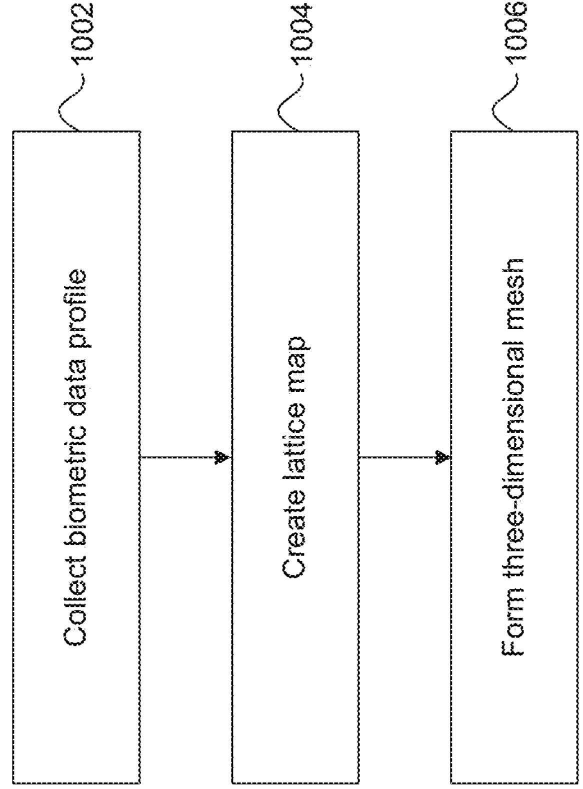
FIG. 10 illustrates a method of making a sole for an article of footwear according to some embodiments.
Figure 11:
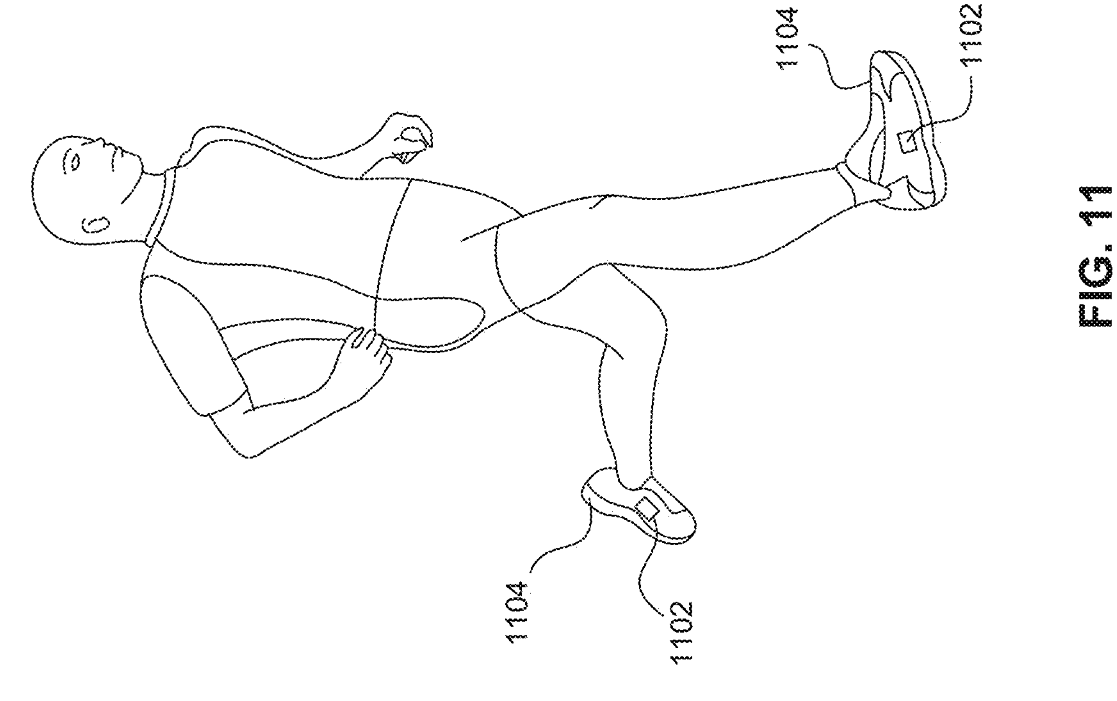
FIG. 11 is an illustration of an individual having sensor modules coupled to articles of footwear.

FIG. 10 shows a method 1000 of making a midsole (e.g. midsole 300) according to some embodiments. In step 1002 a biometric data profile for an individual (e.g., individual 1100 shown in FIG. 11), or a group of individuals, may be collected. In some embodiments, a biometric data profile may be collected using a physiological and personal characteristic collection and analysis system, such as a Run Genie® system. In some embodiments, the biometric data profile may be collected using the data collection and analysis system described in U.S. patent application Ser. No. 14/579,226, filed on Dec. 22, 2014 and published as US 2016/0180440, which is hereby incorporated by reference in its entirety by reference thereto.

The physiological characteristics collected in step 1002 may be physiological characteristics for an individual or a group of individuals. The physiological characteristics collected in step 1002 may include, but are not limited to, gait characteristics, such as foot strike type (e.g. heel, midfoot, forefoot, etc.), rate of pronation or supination, and degree of pronation and supination. In some embodiments, step 1002 may include receiving personal information about the individual(s) before or after receiving physiological characteristics data about the individual(s). Personal information may include information such as their name, prior injury information, height, weight, gender, shoe size, an athletic goal, intended athletic environment or terrain, intended athletic activity duration, intended athletic activity frequency, intended athletic activity distance, quantitative or qualitative preferences about athletic equipment or footwear (such as level of cushion, preference of weight, materials and the like), and current athletic footwear.

In some embodiments, step 1002 may include receiving biometric data via a local wired or wireless connection. In some embodiments step 1002 may include monitoring individual(s) 1100 in real time during an athletic activity, such as jogging.

Physiological characteristics may be collected using one or more sensor modules 1102. A sensor module 1102 may include one or more sensors, and may be physically coupled to an object (e.g., article of footwear 1104) during an everyday or athletic activity conducted by individual(s) 1100. A sensor module 1102 may be used to monitor changes in the spatial orientation of an individual's body or a piece of the individual's athletic equipment or article of footwear in some embodiments. Sensor module 1102 may be used in combination with predetermined correlation data stored in a data structure to determine a correlation between body or equipment or article of footwear movement data and a characteristic such as a gait characteristic in some embodiments.

In some embodiments, a sensor module 1102 is placed and/or built into article of footwear 1104 to measure, for example, a runner's running form and gait cycle (e.g., sensor is placed on, removably attached to, or built into the heel, midsole, or toe of article of footwear 1104). Additional sensors/motion monitors can also be placed on the runner's knee and hip, for example, to obtain more information about the runner's running form.

Sensor module 1102 may include a plurality of sensors, including but not limited to, one or more motion sensors, such as acceleration sensors and magnetic field sensors, or angular momentum sensors. In some embodiments, sensor module 1102 may include one or more temperature sensors, a heart rate monitoring device, a pedometer, and/or an accelerometer-based monitoring device. Sensors of sensor module 1102 may be capable of measuring a variety of athletic performance parameters. The term "performance parameters" may include physical parameters and/or physiological parameters associated with the individual's 1100 athletic activity. Physical parameters measured may include, but are not limited to, time, distance, speed, pace, pedal count, wheel rotation count, rotation generally, stride count, stride length, airtime, stride rate, altitude, temperature, strain, impact force, jump force, force generally, and jump height. Physiological parameters measured may include, but are not limited to, heart rate, respiration rate, blood oxygen level, blood lactate level, blood flow, hydration level, calories burned, or body temperature.

An acceleration sensor may be adapted to measure the acceleration of the sensor module 1102. Accordingly, when the sensor module 1102 is physically coupled to an object (such as an individual's 1100 body, article of footwear 1104, or other a piece of athletic equipment), the acceleration sensor may be capable of measuring the acceleration of the object, including the acceleration due to the earth's gravitational field. In some embodiments, an acceleration sensor may include a tri-axial accelerometer that is capable of measuring acceleration in three orthogonal directions. In some embodiments one, two, three, or more separate accelerometers may be used.

A magnetic field sensor may be adapted to measure the strength and direction of magnetic fields in the vicinity of sensor module 1102. Accordingly, when sensor module 1102 is physically coupled to an object (such as an individual's 1100 body, article of footwear 1104, or other a piece of athletic equipment), a magnetic field sensor may be capable of measuring the strength and direction of magnetic fields in the vicinity of the object, including the earth's magnetic field. In some embodiments, a magnetic field sensor may be a vector magnetometer. In some embodiments, a magnetic field sensor may be a tri-axial magnetometer that is capable of measuring the magnitude and direction of a resultant magnetic vector for the total local magnetic field in three dimensions. In some embodiments one, two, three, or more separate magnetometers may be used.

In some embodiments, an acceleration sensor and a magnetic field sensor may be contained within a single accelerometer-magnetometer module bearing model number LSM303DLHC made by STMicroelectronics of Geneva, Switzerland.

An angular momentum sensor, which may be, for example, a gyroscope, may be adapted to measure the angular momentum or orientation of sensor module 1102. Accordingly, when the sensor module 1102 is physically coupled to an object (such as an individual's 1100 body, article of footwear 1104, or other athletic equipment), the angular momentum sensor may be capable of measuring the angular momentum or orientation of the object. In some embodiments, an angular momentum sensor may be a tri-axial gyroscope that is capable of measuring angular rotation about three orthogonal axes. In some embodiments one, two, three, or more separate gyroscopes may be used. In some embodiments, angular momentum sensor may be used to calibrate measurements made by one or more of an acceleration sensor and a magnetic field sensor.

A heart rate sensor may be adapted to measure individual's 1100 heart rate. A heart rate sensor may be placed in contact with the individual's 1100 skin, such as the skin of the individual's chest, and secured with a strap. A heart rate sensor may be capable of reading the electrical activity the individual's 1100 heart.

A temperature sensor may be, for example, a thermometer, a thermistor, or a thermocouple that measures changes in the temperature. In some embodiments, a temperature sensor may primarily be used for calibration other sensors, such as, for example, an acceleration sensor and a magnetic field sensor.

In some embodiments, sensor module 1102 may include a position receiver, such as an electronic satellite position receiver that is capable of determining its location (i.e., longitude, latitude, and altitude) using time signals transmitted along a line-of-sight by radio from satellite position system satellites. Known satellite position systems include the GPS system, the Galileo system, the BeiDou system, and the GLONASS system. In some embodiments, a position receiver may be an antenna that is capable of communicating with local or remote base stations or radio transmission transceivers such that the location of sensor module 1102 may be determined using radio signal triangulation or other similar principles. In some embodiments, position receiver data may allow sensor module 1102 to detect information that may be used to measure and/or calculate position waypoints, time, location, distance traveled, speed, pace, or altitude.

Data collected by sensor module 1102 may classify individuals based on their running style, utilizing data analysis such as an anterior-posterior plot angle vs. time; medial-lateral plot angle vs. time; and the like. Calculations of these characteristic many be used to group individuals into different categories (groups), such as a heel striker, a mid foot striker, a forefoot striker, a pronator, supinator, a neutral individual, or some combination of characteristics. In some embodiments, gait analysis may utilize personal information of individual 1100, such a gender, shoe size, height, weight, running habits, and prior injuries.

In some embodiments, a regression analysis can be used to determine gait characteristics such as foot strike type, rate of pronation, degree of pronation, and the like based on acceleration data obtained from sensor module 1102. In some embodiments, the regression analysis can be used to determine gait characteristics such as foot strike type, rate of pronation, degree of pronation, and the like based on other data such as magnetometer data, angular momentum sensor data, or multiple types of data. In some embodiments, the analysis can include other user-input information such as prior injury information, an athletic goal, intended athletic environment or terrain, intended athletic duration, and current athletic footwear.

Athletic goals may be, for example, training for a race, to stay healthy, to lose weight, and training for sports. Other examples of athletic goals may include training for a race, or other sporting event, improving individual fitness, simply enjoy running, or the like. Frequency intervals may include for example about 1 to 2 times per week, about 3 to 4 times per week, about 5 to 7 times per week, or the individual doesn't know. Length intervals may include for example about less than about 5 miles per week, about 5 to 10 miles per week, about 10 to 20 miles per week, greater than about 20 miles per week, or the individual doesn't know. Examples of intended athletic terrain environments may include roads, track, treadmill, trail, gym, or particular athletic fields designed for a specific sport. Examples of athletic equipment preferences may include for example more cushioning, less weight, better fit, strength, durability, intended athletic activity range, balance, weight balance, more color choices, and the like.

Information from sensor module(s) 1102 may be used to map areas of an individual's foot subject to different pressures or stresses. Further, information from sensor module (s) 1102 may be used to generate a biometric date profile map. For example, high stress areas may be associated with a heel portion, areas corresponding to the location of the ball of an individual's foot (i.e., at a position corresponding to a location near the anterior end of metatarsals), and a medial most portion of the individual's arch. Mild stress areas may be associated with a medial portion of the individual's arch and areas corresponding to the location of an individual's phalanges. And low stress areas may be associated with a lateral portion of the individual's arch. The size, location, and degree of stress areas for an individual will depend on, among other things, the anatomy of the individual's foot and the individual's gait.

In some embodiments, collecting a biometric data profile in step 1002 may include obtaining previously collected and stored data for an individual. In some embodiments, collecting biometric data may include obtaining a standard biometric data profile for a group of individuals. For example, a standard profile for individuals having a certain shoe size, weight, height, arch shape, stability characteristic, and/or touchdown characteristic may be retrieved in step 1002.

Figure 12:
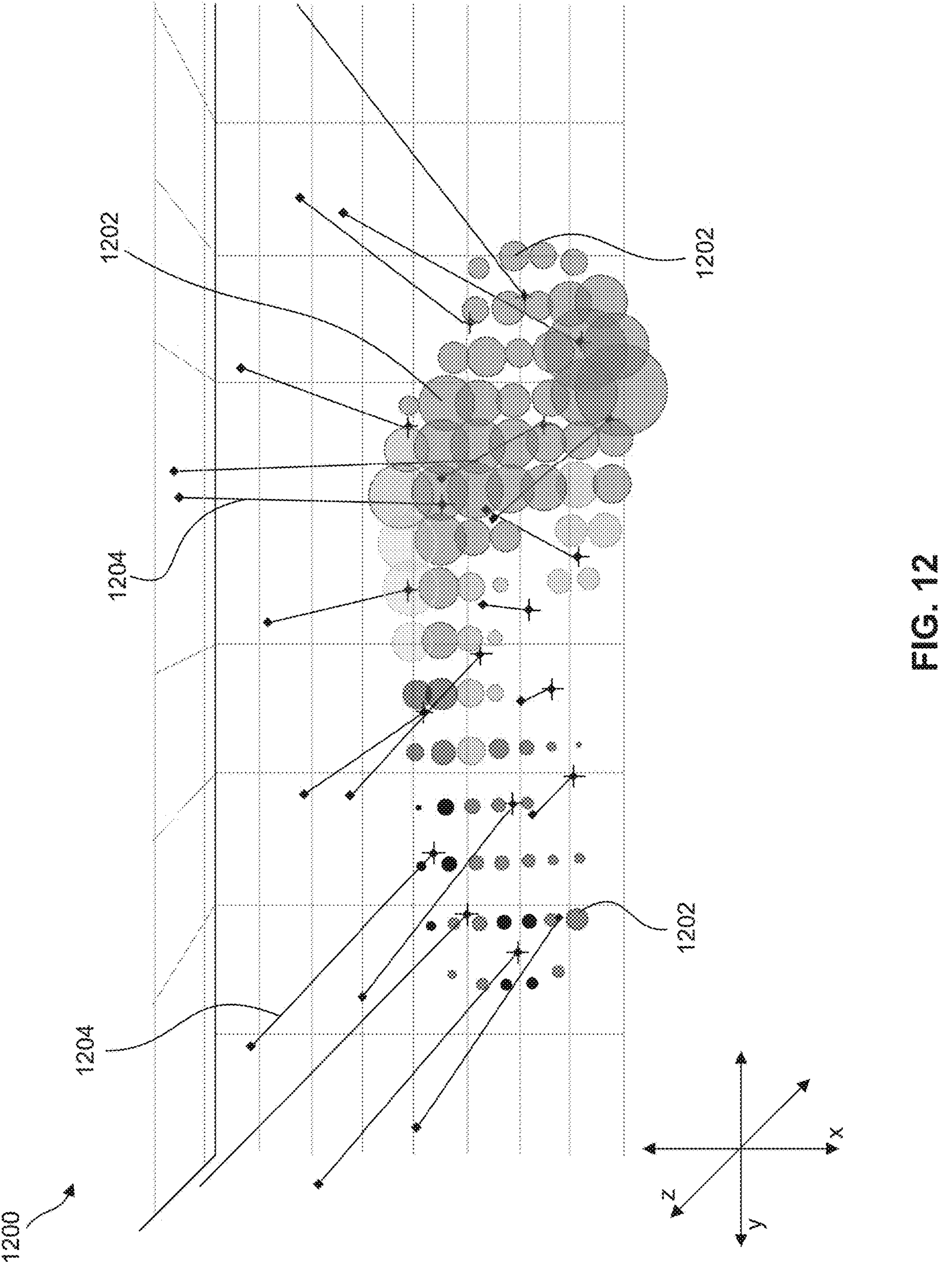
FIG. 12 is a biometric data map according to some embodiments.

In some embodiments, a biometric data profile collected in step 1002 may include a biometric data profile map of stress areas 1202 and vector lines 1204. FIG. 12 shows an exemplary biometric data profile map 1200 according to some embodiments. In some embodiments, biometric data profile map 1200 may be generated based on biometric profile collected for an individual. In some embodiments, biometric data profile map 1200 may be standard biometric data profile map for a group of individuals. For example, biometric data profile map 1200 shown in FIG. 12 may be a standard biometric profile map for a group of individuals classified based on a stability characteristic (e.g., pronator, mild pronator, neutral, or supinator) and/or a touchdown characteristic (e.g., heavy heel striker, heel striker, midfoot striker, or forefoot striker). As used herein a "stability characteristic" refers to how an individual's foot rolls when it contacts the ground and a "touchdown characteristic" refers to how an individual's foot strikes the ground.

Map 1200 includes a plurality of stress areas 1202 and vector lines 1204. The size of a stress area 1202 indicates the magnitude of a vertical load imparted on a sole for an individual, or group of individuals. A larger size stress area 1202 indicates a larger vertical load compared to a smaller size stress area 1202. The vector lines 1204 represent the shear vector applied at different locations on a sole for an individual, or group of individuals. The longer the vector line 1204, the higher the magnitude of shear that is applied.

In embodiments including a biometric data profile map 1200 for an individual, map 1200 may include various stress areas 1202 associated with a particular individual based on information from sensor module(s) 1102. In embodiments including a standard biometric data profile map, map 1200 may include various stress areas 1202 associated with different groups of individuals, based on information from sensor module(s) 1102.

A biometric data profile map 1200, along with another information collected about an individual (e.g., athletic goals), may be used to create a lattice map for a three-dimensional mesh in step 1004. In such embodiments, different regions of the lattice map may designate different mechanically anisotropic regions of a three-dimensional mesh. For example, the following describes the creation of a lattice map for a map 1200 of stress areas 1202 comprising (i) a first zone of stress areas having a first average vertical load and vector lines 1204 predominately oriented in a first direction and (ii) a second zone of stress areas having a second average vertical load greater than the first average vertical load and vector lines 1204 predominately oriented in a second direction different from the first direction. In such embodiments, the lattice map can include (i) a first lattice zone corresponding to the first zone of stress areas and designated to have a first set of lattice shear moduli and (ii) a second lattice zone corresponding to the second zone of stress areas and designated to have a second set of lattice shear moduli. The values of the first and second sets of lattice shear moduli can be based on the map 1200 and other biometric data collected in step 1002. For example, the second set of lattice shear moduli may include a relatively high lattice shear modulus measured in the second direction to provide additional stiffness to counteract the relatively large vertical load and shear vector applied on the second zone.

In some embodiments, creating a lattice map in step 1004 may include obtaining a previously generated lattice map for an individual. In some embodiments, creating a lattice map in step 1004 may include obtaining a standard lattice map for a group of individuals. For example, a standard lattice map for an individual having a certain shoe size, weight, height, stability characteristic, arch shape, and/or touchdown characteristic may be retrieved in step 1004.

In step 1006, a three-dimensional mesh may be formed based on the lattice map created in step 1004. For example, step 1006 may include forming a set of interconnected unit cells 322 that define a first mechanically anisotropic region having the first set of lattice shear moduli at a location corresponding to the first lattice zone and forming a second set of interconnected unit cells 322 that define a second mechanically anisotropic region having the second set of lattice shear moduli at a location corresponding to the second lattice zone. Forming the three-dimensional mesh in step 1006 may include a 3-D printing process.

In some embodiments, the cross-sectional shape of one or more of the struts 330 defining a unit cell 322 may be designed to provide the unit cell 322, and therefore a three-dimensional mesh 320, with desired mechanical properties. In some embodiments, the orientation of the cross-sectional shape of one or more of the struts 330 defining a unit cell 322 may be designed to provide the unit cell 322, and therefore a three-dimensional mesh 320, with desired mechanical properties. The cross-sectional shape of strut 330, and the orientation of that cross-sectional shape, can influence the mechanical properties of a unit cell 322. For example, the cross-sectional shape and orientation of that shape can influence the shear modulus of a unit cell 322 measured in a particular direction.

FIGS. 13A-13C show exemplary cross-sectional shapes for struts 330 according to some embodiments. FIG. 13A illustrates a circular cross-sectional shape having a height (H), a width (W), and an effective diameter (D). FIG. 13B illustrates an oval-shaped cross-sectional shape having a height (H), a width (W), and an effective diameter (D). FIG. 13C illustrates an I-beam-shaped cross-sectional shape having a height (H), a width (W), and an effective diameter (D).

The circular cross-sectional shape shown in FIG. 13A is an example of a shape that will perform substantially the same in any orientation within a unit cell 322 and a three-dimensional mesh 320. The height, width, and effective diameter of the circular cross-sectional shape are the same.

The oval-shaped cross-sectional shape shown in FIG. 13B is an example of a shape that will perform differently in different orientations within a unit cell 322 and a three-dimensional mesh 320. The height of the oval is larger than the width of the oval, so the shape can produce different mechanical properties depending on its orientation within a unit cell 322 and a three-dimensional mesh 320. For example, for bend forces applied parallel to the direction of its height and width, the oval shape is stronger in the height direction because the height is larger than the width.

The I-beam cross-sectional shape shown in FIG. 13C is another example of a shape that will perform differently in different orientations within a unit cell 322 and a three-dimensional mesh 320. The height of the I-beam is larger than the width of the I-beam, so the shape can produce different mechanical properties depending on its orientation within a unit cell 322 and a three-dimensional mesh 320. For example, for bend forces applied parallel to the direction of its height and width, the I-beam shape is stronger in the height direction because the height is larger than the width.

In some embodiments, struts 330 having a cross-sectional shape with a height dimension larger than a width dimension may be oriented such that the height dimension points towards top side 310 and bottom side 312 of a three-dimensional mesh 320. In such embodiments, the struts 330 may provide a higher shear strength compared to struts 330 having a cross-sectional shape with a height dimension larger than a width dimension and oriented such that the height dimension points towards medial side 306 and lateral side 308 of a three-dimensional mesh 320.

In some embodiments, struts 330 having a cross-sectional shape with a height dimension larger than a width dimension may be oriented such that the width dimension points towards top side 310 and bottom side 312 of a three-dimensional mesh 320. In such embodiments, the struts 330 may provide a lower shear strength compared to struts 330 having a cross-sectional shape with a height dimension larger than a width dimension and oriented such that the width dimension points towards medial side 306 and lateral side 308 of a three-dimensional mesh 320.

By effectively orienting the cross-sectional shapes of struts 330, a three-dimensional mesh 320 may be provided with desirable mechanical properties. For example, a three-dimensional mesh 320 may be provided with desirable anisotropic shear lattice moduli. In some embodiments, the orientation of the cross-sectional shapes for struts can be leveraged to increase the strength to weight ratio of a three-dimensional mesh. For example, a three-dimensional mesh may be designed to be lighter by leveraging the superior strength properties for certain cross-sectional shapes, like an I-beam's superior bend strength in a direction parallel to the direction of height (H) shown in FIG. 13C.

In some embodiments, different regions of a three-dimensional mesh 320 may include struts 330 having different cross-sectional shapes to impart different mechanical properties in those regions. In some embodiments, different regions of a three-dimensional mesh may include struts 330 having the same cross-sectional shape oriented in different directions to impart different mechanical properties in those regions.

Figure 14:
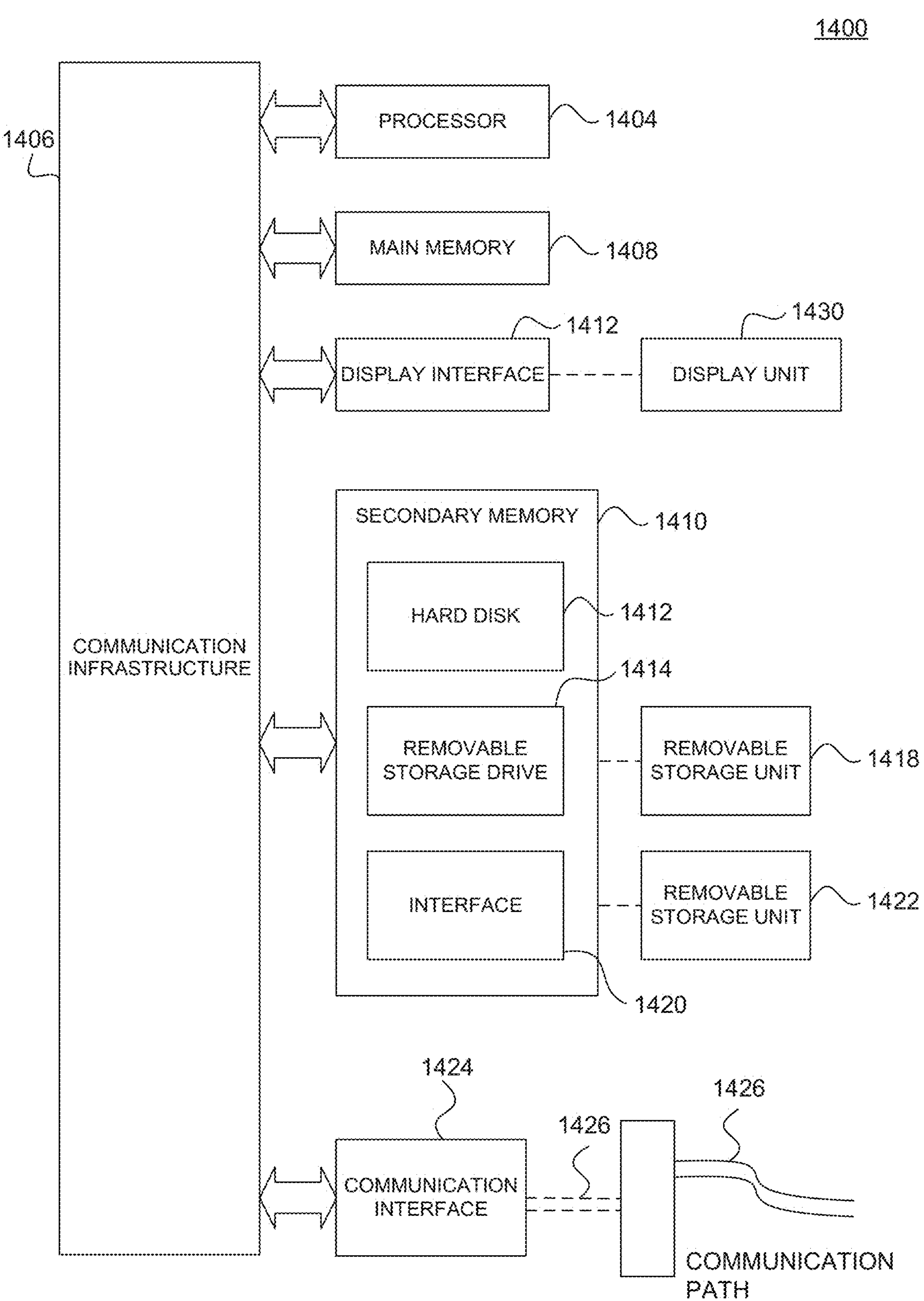
FIG. 14 is a schematic block diagram of an exemplary computer system in which embodiments may be implemented.

FIG. 14 illustrates an exemplary computer system 1400 in which embodiments, or portions thereof, may be implemented as computer-readable code. For example, aspects of the methods discussed herein may be implemented in computer system 1400 using hardware, software, firmware, tangible computer readable media having instructions stored thereon, or a combination thereof and may be implemented in one or more computer systems or other processing systems.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the inventions may be implemented in terms of this example computer system 1400. After reading this description, it will become apparent to a person skilled in the relevant art how to implement one or more of the inventions using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1404 may be a special purpose or a general-purpose processor device. As will be appreciated by persons skilled in the relevant art, processor device 1404 may also be a single processor in a multi-core/multiprocessor system, such system operating alone, or in a cluster of computing devices operating in a cluster or server farm. Processor device 1404 is connected to a communication infrastructure 1406, for example, a bus, message queue, network, or multi-core message-passing scheme.

Computer system 1400 also includes a main memory 1408, for example, random access memory (RAM), and may also include a secondary memory 1410. Secondary memory 1410 may include, for example, a hard disk drive 1412, or removable storage drive 1414. Removable storage drive 1414 may include a floppy disk drive, a magnetic tape drive, an optical disk drive, a flash memory, a Universal Serial Bus (USB) drive, or the like. The removable storage drive 1414 reads from and/or writes to a removable storage unit 1418 in a well-known manner. Removable storage unit 1418 may include a floppy disk, magnetic tape, optical disk, etc. which is read by and written to by removable storage drive 1414. As will be appreciated by persons skilled in the relevant art, removable storage unit 1418 includes a computer usable storage medium having stored therein computer software and/or data.

Computer system 1400 (optionally) includes a display interface 1402 (which can include input and output devices such as keyboards, mice, etc.) that forwards graphics, text, and other data from communication infrastructure 1406 (or from a frame buffer not shown) for display on display unit 1430.

In alternative implementations, secondary memory 1410 may include other similar means for allowing computer programs or other instructions to be loaded into computer system 1400. Such means may include, for example, a removable storage unit 1422 and an interface 1420. Examples of such means may include a program cartridge and cartridge interface (such as that found in video game devices), a removable memory chip (such as an EPROM, or PROM) and associated socket, and other removable storage units 1422 and interfaces 1420 which allow software and data to be transferred from the removable storage unit 1422 to computer system 1400.

Computer system 1400 may also include a communication interface 1424. Communication interface 1424 allows software and data to be transferred between computer system 1400 and external devices. Communication interface 1424 may include a modem, a network interface (such as an Ethernet card), a communication port, a PCMCIA slot and card, or the like. Software and data transferred via communication interface 1424 may be in the form of signals, which may be electronic, electromagnetic, optical, or other signals capable of being received by communication interface 1424. These signals may be provided to communication interface 1424 via a communication path 1426. Communication path 1426 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 1418, removable storage unit 1422, and a hard disk installed in hard disk drive 1412. Computer program medium and computer usable medium may also refer to memories, such as main memory 1408 and secondary memory 1410, which may be memory semiconductors (e.g. DRAMs, etc.).

Computer programs (also called computer control logic) are stored in main memory 1408 and/or secondary memory 1410. Computer programs may also be received via communication interface 1424. Such computer programs, when executed, enable computer system 1400 to implement the embodiments as discussed herein. In particular, the computer programs, when executed, enable processor device 1404 to implement the processes of the embodiments discussed here. Accordingly, such computer programs represent controllers of the computer system 1400. Where the embodiments are implemented using software, the software may be stored in a computer program product and loaded into computer system 1400 using removable storage drive 1414, interface 1420, and hard disk drive 1412, or communication interface 1424.

Embodiments of the inventions also may be directed to computer program products comprising software stored on any computer useable medium. Such software, when executed in one or more data processing device, causes a data processing device(s) to operate as described herein. Embodiments of the inventions may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A sole for an article of footwear, the sole comprising:

a three-dimensional mesh comprising:

a plurality of interconnected unit cells;

a first mechanically anisotropic region comprising: a first group of the interconnected unit cells, a first lattice shear modulus measured in a first direction, and a second lattice shear modulus different from the first lattice shear modulus and measured in a second direction opposite to or orthogonal to the first direction; and a second mechanically anisotropic region comprising: a second group of the interconnected unit cells, a third lattice shear modulus measured in the first direction, and a fourth lattice shear modulus different from the third lattice shear modulus and measured in the second direction, wherein the first lattice shear modulus is at least 10% different from the third lattice shear modulus.

2. The sole of claim 1, wherein the second lattice shear modulus is at least 10% different from the fourth lattice shear modulus.

3. The sole of claim 1, wherein the three-dimensional mesh comprises a mechanically isotropic region comprising a third group of the interconnected unit cells and isotropic mechanical properties.

4. The sole of claim 1, wherein the first group of the interconnected unit cells comprises a 7×7×2 group of the interconnected unit cells, and the second group of the interconnected unit cells comprises a 7×7×2 group of the interconnected unit cells.

5. The sole of claim 1, wherein the first group of the interconnected unit cells comprises mechanically anisotropic unit cells arranged in a plurality of rows within the first mechanically anisotropic region.

6. The sole of claim 5, wherein the second group of the interconnected unit cells comprises mechanically anisotropic unit cells arranged in a plurality of rows within the second mechanically anisotropic region.

7. The sole of claim 1, wherein the first direction is a forward direction pointing away from a heel end of the sole, and the second direction is a rearward direction pointing toward the heel end of the sole.

8. The sole of claim 1, wherein the first direction is a medial direction pointing away from a lateral side of the sole, and the second direction is a lateral direction pointing toward the lateral side of the sole.

9. The sole of claim 1, wherein the first direction is a longitudinal direction extending between a heel end and a forefoot end of the sole, and the second direction is a transverse direction extending between a medial side and a lateral side of the sole.

10. The sole of claim 1, comprising a third mechanically anisotropic region comprising: a third group of the interconnected unit cells, a fifth lattice shear modulus measured in the first direction, and a sixth lattice shear modulus different from the fifth lattice shear modulus and measured in the second direction.

11. The sole of claim 10, wherein the fifth lattice shear modulus is at least 10% different from the first lattice shear modulus and at least 10% different from the third lattice shear modulus.

12. The sole of claim 11, wherein the sixth lattice shear modulus is at least 10% different from the second lattice shear modulus and at least 10% different from the fourth lattice shear modulus.

13. The sole of claim 1, wherein the plurality of interconnected unit cells are additively manufactured unit cells.

14. The sole of claim 1, wherein each of the interconnected unit cells comprises a plurality of struts and a plurality of nodes at which one or more of the struts are connected.

15. A method of making the sole for an article of footwear according to claim 1, the method comprising:

forming the first mechanically anisotropic region and the second mechanically anisotropic region based on a biometric data profile for an individual or group of individuals.

16. The method of claim 15, wherein the biometric data profile comprises a map of stresses comprising a first zone having a first average vertical load and a second zone having a second average vertical load less than the first average vertical load, wherein the first group of the interconnected unit cells is formed in a first location of the three-dimensional mesh corresponding to the first zone in the map of stresses, and wherein the second group of the interconnected unit cells is formed in a second location of the three-dimensional mesh corresponding to the second zone in the map of stresses.

17. The method of claim 15, wherein the biometric data profile comprises a physiological gait characteristic for the individual or group of individuals.

18. The method of claim 17, wherein the biometric data profile further comprises personal information about the individual or group of individuals.

19. The method of claim 18, wherein the personal information is selected from the group consisting of: name, prior injury information, height, weight, gender, shoe size, an athletic goal, intended athletic environment or terrain, intended athletic activity duration, intended athletic activity frequency, intended athletic activity distance, quantitative or qualitative preferences about athletic footwear, and a combination thereof.

20. The method of claim 15, further comprising forming a mechanically isotropic region comprising a third group of the interconnected unit cells and isotropic mechanical properties.

* * * * *